US007257952B2

(12) United States Patent
Bishop et al.

(10) Patent No.: US 7,257,952 B2
(45) **Date of Patent: *Aug. 21, 2007**

(54) METHODS AND APPARATUS FOR COMPRESSED GAS

(75) Inventors: William M. Bishop, Katy, TX (US); Charles N. White, Houston, TX (US); David J. Pemberton, Houston, TX (US)

(73) Assignee: EnerSea Transport LLC, Houston, TX (US)

( * ) Notice: Subject to any disclaimer, the term of this patent is extended or adjusted under 35 U.S.C. 154(b) by 58 days.

This patent is subject to a terminal disclaimer.

(21) Appl. No.: 11/232,347

(22) Filed: Sep. 21, 2005

(65) Prior Publication Data

US 2006/0011235 A1 Jan. 19, 2006

Related U.S. Application Data

(62) Division of application No. 09/945,049, filed on Aug. 31, 2001, now Pat. No. 6,994,104.

(60) Provisional application No. 60/230,099, filed on Sep. 5, 2000.

(51) Int. Cl.

| | |
|---|---|
| ***F17C 3/08*** | (2006.01) |
| ***F17C 11/00*** | (2006.01) |
| ***B65B 1/20*** | (2006.01) |
| ***B65B 31/00*** | (2006.01) |
| ***A01G 25/09*** | (2006.01) |
| ***B60P 3/22*** | (2006.01) |

(52) U.S. Cl. ......................... 62/45.1; 62/53.2; 62/46.1; 141/11; 53/403; 137/899.2

(58) Field of Classification Search ................. 62/45.1, 62/46.1, 53.2; 137/259, 899.2; 141/11; 53/403

See application file for complete search history.

(56) References Cited

U.S. PATENT DOCUMENTS 2,761,397 A * 9/1956 Holst ......................... 105/360

(Continued)

FOREIGN PATENT DOCUMENTS

CA 107339 3/1980

OTHER PUBLICATIONS

D. Stenning; *The Coselle CNG Carrier A New Way to Shop Natural Gas by Sea* [online] [Retrieved on Jun. 21, 2000] Retrieved from the Internet: URL: http://www.coselle.com/tech.htm; http://www.coselle.com/tech2.htm; http://www.coselle.com/tech3.htm; http://www.coselle.com/tech4.htm; and http://www.coselle.com/tech5.htm.

*Primary Examiner*—William C Doerrler
(74) *Attorney, Agent, or Firm*—Conley Rose, P.C.

(57) ABSTRACT

The methods and apparatus for transporting compressed gas includes a gas storage system having a plurality of pipes connected by a manifold whereby the gas storage system is designed to operate in the range of the optimum compressibility factor for a given composition of gas. The pipe for the gas storage system is preferably large diameter pipe made of a high strength material whereby a low temperature is selected which can be withstood by the material of the pipe. Knowing the compressibility factor of the gas, the temperature, and the diameter of the pipe, the wall thickness of the pipe is calculated for the pressure range of the gas at the selected temperature. The gas storage system may either be modular or be part of the structure of a vehicle for transporting the gas. The gas storage system further includes enclosing the pipes in an enclosure having a nitrogen atmosphere. A displacement fluid may be used to offload the gas from the gas storage system. A vehicle with the gas storage system designed for a particular composition gas produced at a given location is used to transport gas from that producing location to a receiving station miles from the producing location.

23 Claims, 9 Drawing Sheets

U.S. PATENT DOCUMENTS 2,795,937 A 6/1957 Sattler et al.
2,938,359 A 5/1960 Cobb, Jr. et al.
2,940,268 A 6/1960 Morrison
2,999,366 A 9/1961 LaFave et al.
3,213,632 A 10/1965 Valk et al.
3,229,473 A 1/1966 Schumacher et al.
3,232,725 A * 2/1966 Campbell et al. ............. 48/190
3,365,898 A 1/1968 Van Kleef
3,387,462 A 6/1968 Bauger et al.
3,863,460 A 2/1975 Straile et al.
3,864,918 A 2/1975 Lorenz
3,885,394 A 5/1975 Witt et al.
4,139,019 A 2/1979 Bresie et al.
4,213,476 A 7/1980 Breisie et al.
4,446,804 A 5/1984 Kristiansen et al.
4,483,376 A 11/1984 Bresie et al.
4,784,399 A * 11/1988 Finn ........................... 280/837
4,846,088 A 7/1989 Fanse et al.
5,169,295 A 12/1992 Stogner et al.
5,199,266 A 4/1993 Johansen
5,276,248 A 1/1994 Engelhardt et al.
5,333,465 A 8/1994 McBride
5,398,629 A 3/1995 Wasenius
5,421,161 A 6/1995 Gustafson
5,429,268 A 7/1995 Hale et al.
5,505,151 A 4/1996 Haaland
5,511,905 A 4/1996 Bishop et al.
5,566,712 A 10/1996 White et al.
5,685,350 A * 11/1997 Chowdhury ................ 141/231
5,803,005 A 9/1998 Stenning et al.
5,839,383 A 11/1998 Stenning et al.
6,003,460 A 12/1999 Stenning et al.
6,584,781 B2 * 7/2003 Bishop et al. ............... 62/54.1
6,725,671 B2 * 4/2004 Bishop ....................... 62/45.1

* cited by examiner

Fig. 17
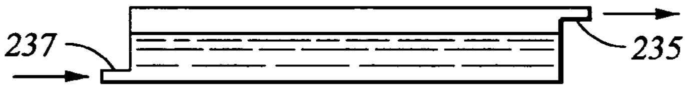
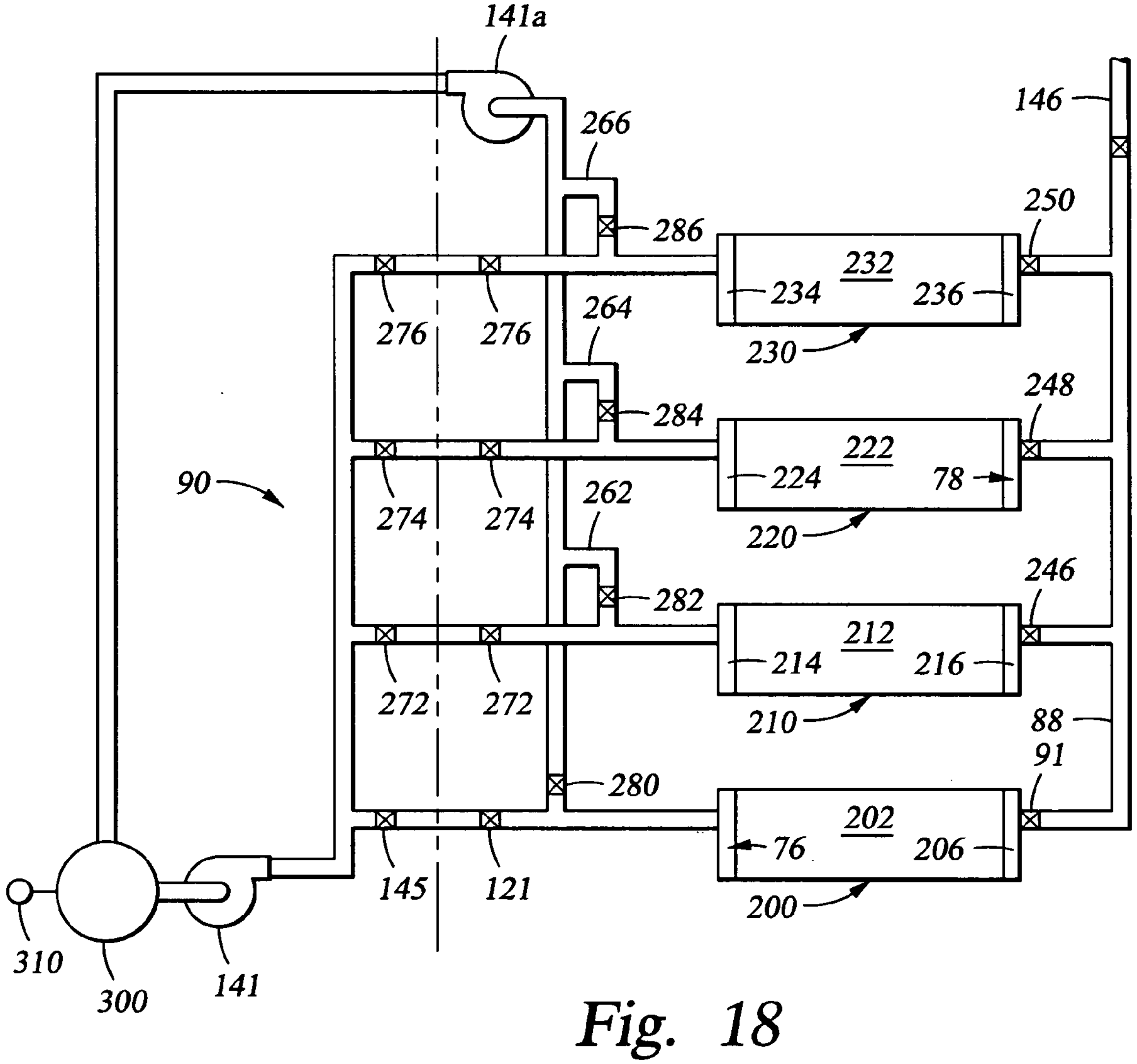
Fig. 18
Fig. 19
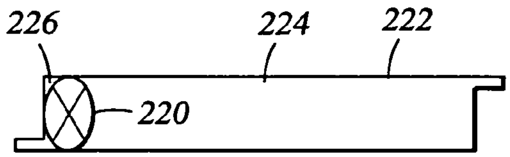
Fig. 20
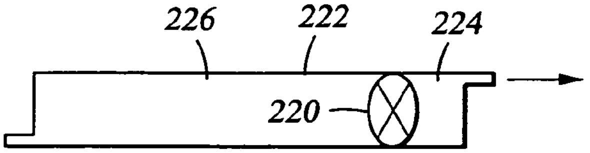

METHODS AND APPARATUS FOR COMPRESSED GAS

CROSS-REFERENCE TO RELATED APPLICATIONS

This application is a divisional of U.S. application Ser. No. 09/945,049 filed Aug. 31, 2001 now U.S. Pat. No. 6,994,104 and entitled "Method and Apparatus for Compressible Gas", which claims benefit of 35 U.S.C. 119(e) of provisional application Ser. No. 60/230,099, filed Sep. 5, 2000 and entitled "Methods and Apparatus for Transporting CNG," hereby incorporated herein by reference, and is related to U.S. Pat. No. 6,584,781, entitled "Methods and Apparatus for Compressed Gas", filed Aug. 31, 2001 and hereby incorporated herein by reference.

STATEMENT REGARDING FEDERALLY SPONSORED RESEARCH OR DEVELOPMENT

Not applicable.

BACKGROUND OF THE INVENTION

This invention relates to the storage and transportation of compressed gases. In particular, the present invention includes methods and apparatus for storing and transporting compressed gas, methods and apparatus for construction of gas storage systems, land vehicles for transporting the compressed gas and storage components for the gas, methods for loading and unloading the gas from those systems, and methods for utilizing gas storage systems. More particularly, the present invention relates to a compressed natural gas storage system specifically optimized and configured to a gas of a particular composition.

The need for transportation and storage of gas has increased as gas resources have been established around the globe. Traditionally, only a few methods have proved viable in transporting and storing gas in large quantities. One transportation method is to build a pipeline and "pipe" the gas directly to a desired location. A typical storage method is to simply build large pressure vessels or storage tanks to store the gas at ambient conditions or at a slightly pressurized condition. As an alternative to large pressure vessels pipeline loops have also been constructed to store a quantity of gas at pipeline conditions.

Due to the limitations of ambient, or near-ambient, storage and transportation methods, other methods have emerged. The most readily apparent problem with gas storage and transportation is that in the gas phase, even below ambient temperature, a small amount of gas occupies a large amount of space. Storing material at that volume is often not economically feasible. The answer lies in reducing the space that the gas occupies. Initially, it would seem intuitive that condensing the gas to a liquid is the most logical solution. A typical natural gas (approximately 90% $CH_4$), can be reduced to $1/600^{th}$ of its gaseous volume when it is compressed to a liquid. Gaseous hydrocarbons that are in the liquid state are known in the art as liquefied natural gas, more commonly known as LNG.

As indicated by the name, LNG involves liquefaction of the natural gas and normally includes transportation and storage of the natural gas in the liquid phase. Although liquefaction would seem a solution to the storage and transportation problems, the drawbacks quickly become apparent. First, in order to liquefy natural gas, it must be cooled to approximately −260° F., at atmospheric pressure, before it will liquefy. Second, LNG tends to warm during long term storage and transport and therefore will not stay at that low temperature so as to remain in the liquefied state. Cryogenic methods must be used in order to keep the LNG at the proper temperature during transport. Thus, the cargo containment systems used to transport LNG must be truly cryogenic. Third, the LNG must be re-gasified at its destination before it can be used.

Cryogenic process requires a large initial cost for LNG facilities at both the loading and unloading ports. The containment systems and storage vessels require exotic metals to hold LNG at −260° F. Liquefied natural gas can also be stored at higher temperatures than −260° F. by raising the pressure but, unless temperatures are kept relatively low, the efficiency of the storage system will quickly deteriorate. Therefore, although the storage temperature may be above −260° F., cryogenic problems still remain and the containment systems now must be pressure vessels. This may not be an economical alternative.

In response to the technical problems of ambient condition storage and transportation and the extreme costs and temperatures of LNG, the method of transporting natural gas in a compressed state was developed. The natural gas is compressed or pressurized to higher pressures, which may be chilled to lower than ambient temperatures, but without reaching the liquid phase. This is what is commonly referred to as compressed natural gas, or CNG.

Several methods have been proposed that are related to the storage and transportation of compressed gases, such as natural gas, in pressurized vessels by overland carriers. The gas is typically transported and stored at high pressure and low temperature to maximize the amount of gas contained in each gas storage system. For example, the compressed gas may be in a dense single-fluid ("supercritical") state, that is characterized by the presence of a very dense gas but with no liquids.

The transportation of CNG by overland vehicles typically employs trucks or trains. The vehicles include gas storage containers, such as metal pressure bottle containers. These storage containers are resistant internally to the high pressure and low temperature conditions under which the CNG is stored. The containers must be internally insulated throughout to keep the CNG and its storage containers at approximately the loading temperature throughout the travel and delivery of the gas and also to keep the substantially empty containers near that temperature during the return trip.

Before the CNG is transported, it is first brought to the desired operating state, normally by compressing the gas to a high pressure and cooling it to a low temperature. For example, U.S. Pat. No. 3,232,725, hereby incorporated herein by reference for all purposes, discloses the preparation of natural gas to conditions suitable for large volume marine transportation. After compression and cooling, the CNG is loaded into the storage containers of the storage systems. The CNG is then transported to its destination.

When reaching its destination, the CNG is unloaded, typically at a terminal comprising a number of high pressure storage containers or an inlet to a high pressure turbine. If the terminal is at a pressure of, for example, 1000 pounds per square inch ("psi") and the storage containers are at 2000 psi, valves may be opened and the gas expanded into the terminal until the pressure in the storage containers drops to some final pressure between 2000 psi and 1000 psi. If the volume of the terminal is very much larger than the combined volume of all the storage containers together, the final pressure will be about 1000 psi.

Using conventional procedures, the transported CNG remaining in the storage containers (the "residual gas") is then compressed into the terminal storage container using compressors. Compressors are expensive and increase the capital cost of the unloading facilities. Additionally, the temperature of the residual gas is increased by the heat of compression. The higher temperature increases the required storage volume unless the heat is removed, or excess gas removed, and raises the overall cost of transporting the CNG.

Previous efforts to reduce the expense and complexity of unloading CNG, and the residual gas in particular, have introduced problems of their own. For example, U.S. Pat. No. 2,972,873, hereby incorporated herein by reference for all purposes, discloses heating the residual gas to increase its pressure, thereby driving it out of the vehicle storage containers. Such a scheme simply replaces the additional operating cost associated with operating the compressors with an operating cost for supplying heat to the storage containers and residual gas. Further, the design of the piping and valve arrangements for such a system is necessarily extremely complex because the system must accommodate the introduction of heating devices or heating elements into the storage containers.

In summary, although CNG transportation and storage reduces the capital costs associated with LNG, the costs are still high due to a lack of efficiency by the methods and apparatus used. This is due primarily to the fact that prior art methods do not optimize the vessels and facilities for a particular gas composition. In particular, prior art apparatus and methods are not designed based upon a specific composition of gas to determine the optimum storage conditions for that particular gas.

U.S. Pat. No. 4,846,088 discloses the use of pipe for compressed gas storage on an open barge. The storage components are strictly confined to be on or above the deck of the ship. Compressors are used to load and off load the compressed gas. However, there is no consideration of a pipe design factor and no attempt is made to utilize the maximum compressibility factor for the gas.

U.S. Pat. No. 3,232,725 does not contemplate a specific compressibility factor to determine the appropriate pressure for the gas. Instead, the '725 patent discloses a broad range or band to get greater compressibility. However, to do that, the gas container wall thickness will be much greater than is necessary. This would be particularly true when operated at a lower pressure causing the pipe to be over designed (unnecessarily thick). The '725 patent shows a phase diagram for a mixture of methane and other hydrocarbons. The diagram shows an envelop inside which the mixture exists as both a liquid and a gas. At pressures above this envelop the mixture exists as a single phase, known as the dense phase or critical state. If the gas is pressured up within that state, liquids will not fall out of the gas. Also, good compression ratios are achieved in that range. Thus, the '725 patent recommends operation in that range. The '725 patent does not pick a particular gas composition to match a particular gas reservoir.

The '725 patent graph is based on the lowering of temperatures. However, the '725 patent does not design its method and apparatus by optimizing the compressibility factor at a certain temperature and pressure and then calculating the wall thickness for the storage container needed for a certain gas. Since much of the capital cost comes from the large amount of metal, or other material, required for the pipe storage components, the '725 misses the mark. The range offered in the '725 patent is very broad and is designed to cover more than one particular gas mixture, i.e., gas mixtures with different compositions.

U.S. Pat. No. 4,446,232 discloses offloading using a displacing fluid. The '232 patent does not consider low temperature fluids. It also does not consider onshore storage and thermal shock. The '332 patent carries the displacement fluid on the vessel which is used to displace sequential tanks. No mention is made of low temperature requirements.

U.S. Pat. No. 5,429,268 discloses the storage of compressed natural gas in pipes, which may be stationary or mobile as required. The pipes are supported in a vessel cradle having semi-circular concave portions.

U.S. Pat. No. 5,566,712 discloses a system for handling, storing, transporting, and dispensing cryogenic fluids, liquid natural gas, and compressed natural gas. The system includes a container in a frame disposed on a flat car. The gas may be injected into the engine's combustion chamber.

Another problem in the energy industry relates to gas storage and occurs during "peak shaving." Energy consumption by consumers is not constant over time and there are periods when there is a greater demand for energy than other periods, particularly during the work day when energy consumption is higher due to industry and business operations and particularly when the temperature during the day is at its highest requiring additional energy due to the widespread operation of air conditioning. Peak shaving occurs when a power company encounters a time period when there is a peak demand for energy or power. That spike in energy consumption is met by consuming additional gas to generate the additional energy to meet that spike demand. Presently, power companies pay for a steady delivery of gas throughout the day at a volume which will meet peak shaving even though such gas volume is not required throughout the day. Thus power companies pay for this excess capacity without regard to peak periods of demand which is expensive. For example power companies pay the pipeline companies for this peak capacity throughout the whole heating season. It would be an advantage if the power companies could draw upon a reserve of gas during peak shaving to avoid paying for excess capacity of gas to produce additional energy during peak demand periods.

Another concern associated with natural gas relates to the development and testing of new oil and gas wells, particularly off-shore wells. Gas is typically produced during a test of the new well. Presently when conducting an extended well test on a new offshore well, a production package is disposed on the off-shore rig to separate the oil from the gas being produced. Although the government has a policy of not allowing the flaring of gas, the government has been allowing the gas produced by the hew well to be flared into the atmosphere. Of course, it is not cost effective to run a pipeline to the rig for the gas until the well has been tested to ensure enough gas is being produced to warrant a pipeline. An alternative to flaring the gas is needed.

The present invention overcomes the deficiencies of the prior art by providing a method for optimizing a storage container for compressed gas and a method for loading and unloading the gas.

SUMMARY OF THE INVENTION

The methods and apparatus of the present invention for transporting compressed gas includes a gas storage system optimized for storing and transporting a compressible gas. The gas storage system includes a plurality of pipes in parallel relationship and a plurality of support members extending between adjacent tiers of pipe. The support members have opposing arcuate recesses for receiving and housing individual pipes. Manifolds and valves connect with the ends of the pipe for loading and off-loading the gas. The pipes and support members form a pipe bundle which is enclosed in insulation and preferably in a nitrogen enriched environment.

The gas storage system is optimized for storing a compressible gas, such as natural gas, in the dense phase under pressure. The pipes are made of material which will withstand a predetermined range of temperatures and meet required design factors for the pipe material, such as steel pipe. A chilling member cools the gas to a temperature within the temperature range and a pressurizing member pressurizes the gas within a predetermined range of pressures at a lower temperature of the temperature range where the compressibility factor of the gas is at a minimum. The preferred temperature and pressure of the gas maximizes the compression ratio of gas volume within the pipes to gas volume at standard conditions. The compression ratio of the gas is defined as the ration between the volume of a given mass of gas at standard conditions to the volume of the same mass of gas at storage conditions.

As for example, one preferred embodiment of the gas storage system includes pipes made of X-60 or X-80 premium high strength steel with the gas having a temperature range of between −20° F. and 0° F. The lower temperature in the range is −20° F. For X-100 premium high strength steel, the lower temperature may be negative 40° F. For a gas with a specific gravity of about 0.6, the pressure range is between 1,800 and 1,900 psi and for a gas with a specific gravity of about 0.7, the pressure range is between 1,300 and 1,400 psi. The range of pressures at the lower temperature is the pressure range where the efficiency of the system is kept within a desired range of operating efficiencies.

Once the strength of the steel and the pipe diameter are selected, for a given design factor, the pipe wall thickness is determined by maximizing the ratio of the mass of the stored gas to the mass of the steel pipe. By way of further example, for a gas with a specific gravity of substantially 0.6 and where the design factor is one-half the yield strength of the steel pipe having a yield strength of 100,000 psi and a pipe diameter of 36 inches, the pipe wall thickness will be between 0.66 and 0.67 inches. For a gas with a specific gravity of substantially 0.7 in the above example, the pipe wall thickness will be between 0.48 and 0.50 inches.

The wall thickness of the pipe may be increased by adding an additional thickness of material for a corrosion or erosion allowance. This thickness is above the thickness required to maintain the resultant yield stress. This allowance may be as much as 0.063 inches or greater depending on the application. The large diameter pipe used in the current invention allows this allowance to be incorporated without unacceptable degradation of the system efficiency. Although the preferred embodiment of the present invention uses high strength carbon steel pipe, other materials may find application in this system. Materials such as stainless steels, nickel alloys, carbon-fiber reinforced composites, as well as other materials may provide an alternative to high strength carbon steel.

The present invention is also directed to methods and apparatus for transporting compressed gases on a land based vehicle. Preferably the gas storage system on the vehicle is designed for transporting a gas with a particular gas composition. Where the gas to be transported varies from the design gas composition for the gas storage system, a gas of a second gas composition may be added or removed from the gas to be transported until the resultant gas has the same gas composition as the particular gas composition for which the gas storage system is designed.

The gas storage system may be built as a modular unit with the modular unit either being supported by a vehicle or being installed on the ground. The pipes in the modular unit may extend either vertically, horizontally, or any other angle.

The stored gas is preferably unloaded by pumping a displacement fluid into one end of the gas storage system and opening the other end of the gas storage system to enable removal of the gas. A displacement fluid is selected which has a minimal absorption by the gas. A separator may be disposed in the gas storage system to separate the displacement fluid from the gas to further prevent absorption. Preferably, the gas is off-loaded one tier of pipes at a time. The gas storage system may also be tilted at an angle to assist in the off-loading operation.

One method of transporting the gas includes optimizing the gas storage system on the vehicle for a particular gas composition for a gas being produced at a specific geographic location. The system includes a loading station at the source of the natural gas and a receiving station for unloading the gas at its destination. The gas storage system is optimized at a pressure and temperature that minimizes the compressibility factor of the gas and maximizes the compression ratio of the gas.

Although the present invention is particularly directed to methods and apparatus for transporting and storing compressed gas, it should be appreciated that the embodiments of the present invention are also applicable to transporting and storing liquids such as liquid propane.

The embodiments of the present invention provide many unique features including but not limited to:

a) Construction of a gas storage system as a containerized system allowing the transport of the system on a vehicle wherein the gas storage system is essentially independent of the structure of the vehicle;

c) Staged off-loading using low freezing point liquid stored;

d) Off-loading using liquid driven pigs to separate the gas from the liquid;

e) Matching of gas storage pipe dimensions, such as diameter and wall thickness, to the optimized compressibility factor for the composition of a defined gas supply so as to minimize the weight of the steel per unit weight of stored gas;

f) Use of premium pipe, manufactured to accepted standards, such as API, ASME, with a design factor higher than that for individually built pressure vessels, i.e., the design factor being higher than 0.25 or similar standard;

g) Construction of a gas storage system as a containerized, modular system;

h) Insulation wrap of the entire gas storage container, reducing temperature rise to an acceptable rate for the desired service, such as less than one degree per 100 hours;

i) Tilting of the gas storage system, in order to decrease surface contact area between the stored gas and the displacement liquid and maximize the evacuation of displacement liquid from the gas storage system;

j) Taking pressure drop across control valve during the off-loading phase outside of the primary gas containers;

k) Use of manifolding to isolate the specific pipes of a gas storage system most prone to damage from external causes;

l) Hydrostatic testing during liquid displacement; and m) Methods for utilizing a gas storage system constructed in accordance with the present invention.

An advantage of the present invention is that the high capital costs and cryogenic procedures normally associated with long term, large volume storage and transportation of natural gas may be significantly reduced making the profitability of the present invention greater than previously used methods and apparatus.

The present invention includes improvement of CNG storage and transportation methods and apparatus, by optimizing the CNG storage conditions, thereby overcoming the deficiencies of the prior methods of natural gas storage and transportation.

Other objects and advantages of the invention will appear from the following description.

BRIEF DESCRIPTION OF THE DRAWINGS

For a detailed description of a preferred embodiment of the invention, reference will now be made to the accompanying drawings wherein:

FIG. 17 is a schematic of a modular storage unit for liquid displacement of the stored gas;

FIG. 18 is a schematic of a staged off-load of the gas stored in the gas storage pipes using a displacement liquid;

FIG. 19 is a side view of a storage pipe with a pig in one end for displacing the stored gas;

FIG. 20 is a side view of the storage pipe of FIG. 19 with the pig at the other end of the pipe having displaced the stored gas;

Figure 1:
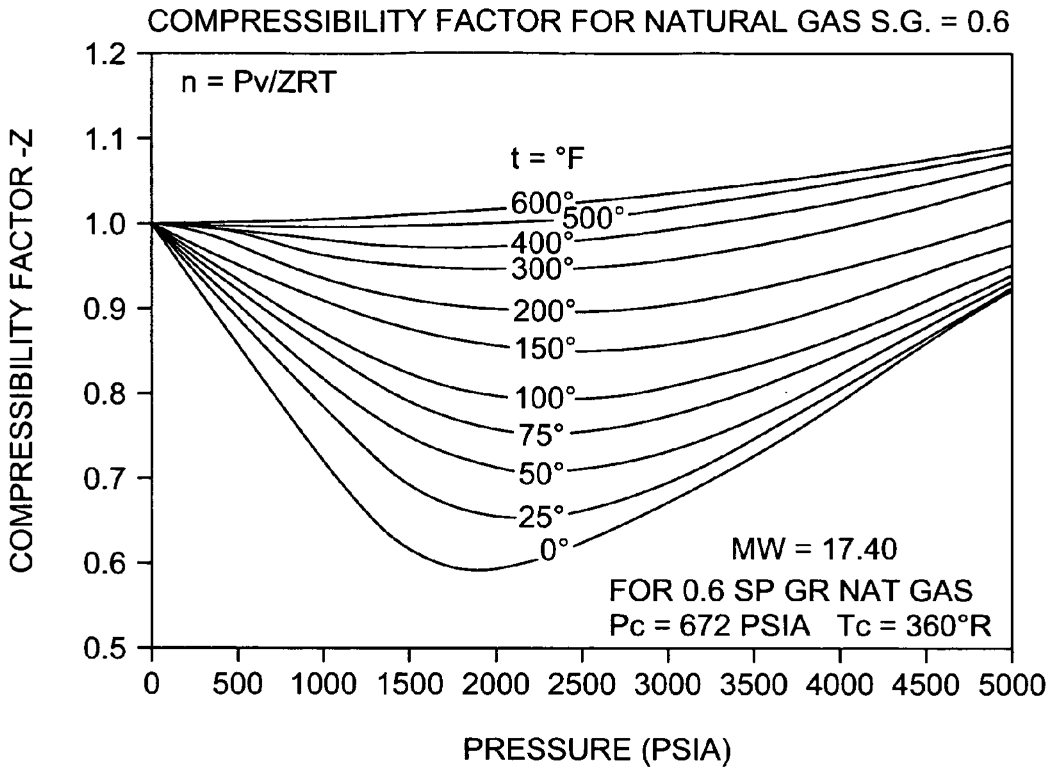
FIG. 1 is a graph of gas compressibility factor versus gas pressure for a gas with a specific gravity of 0.6.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

BRIEF DESCRIPTION OF THE PREFERRED EMBODIMENTS

In the description which follows, like parts are marked throughout the specification and drawings with the same reference numerals, respectively. The drawing figures are not necessarily to scale. Certain features of the preferred embodiments may be shown in exaggerated scale or in somewhat schematic form and some details of conventional elements may not be shown in the interest of clarity and conciseness. It is understood that the systems disclosed in this application are intended to be designed in accordance with applicable design standards for the uses intended, as published by recognized regulatory agencies, such as the American Petroleum Institute (API), American Society of Mechanical Engineering (ASME), and the Department of Transportation.

The present invention is directed to several areas including but not limited to methods and apparatus for gas storage and transportation; methods of construction for the storage apparatus; methods and apparatus for on-loading and off-loading gas to and from a gas storage system; and methods for employing the gas storage system and the transportation of gas. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

In particular, various embodiments of the present invention provide a number of different constructions and methods of operation of the apparatus of the present invention. The embodiments of the present invention provide a plurality of methods for using the apparatus of the present invention. It is to be fully recognized that the different teachings of the embodiments discussed below may be employed separately or in any suitable combination to produce desired results.

It should be appreciated that the present invention may by used with any gas and is not limited to natural gas. The description of the preferred embodiments for the storage and transportation of natural gas is by way of example and is not to be limiting of the present invention.

Gas Storage

The preferred embodiment of the gas storage system is designed for gas temperatures and pressures where the gas is maintained in a dense single-fluid ("supercritical") state, also known as the dense phase. This phase occurs at high pressures where separate liquid and gas phases cannot exist. For example, separate phases for compressed natural gas, or CNG, do occur once the gas drops to around 1000 psia. As long as the natural gas, which is primarily methane, is maintained in the dense phase, the heavier hydrocarbons, such as ethane, propane and butane, that contribute to a low compressibility value, do not drop out when the gas is chilled to the gas storage temperature at the gas storage pressure. Thus, in the preferred embodiment, the natural gas is compressed or pressurized to higher pressures and chilled to lower than ambient temperatures, but without reaching the liquid phase, and stored in the gas storage system. Maintaining the gas as CNG rather than LNG, avoids the requirement of cryogenic processes and facilities with a large initial cost at both the loading and unloading ports.

The methods and apparatus of the present invention optimize the compression of the gas to be transported and/or stored. The optimization of the gas storage increases payload while reducing the amount of material needed for the storage components, thereby increasing the efficiency of transport and reducing capital costs. To calculate the optimized compression of the gas to be transported and/or stored, the compressibility factor is minimized and the compression ratio is maximized at a given pressure, as compared to standard conditions for a particular gas. In the preferred embodiment described, the gas to be transported and/or stored is natural gas. However, the present invention is not limited to natural gas and may be applied to any gas. Additionally, the means of maximizing the amount of stored gas per unit of material may be used for other storage as well, such as onshore, at-shore, or offshore platforms.

With any gas, the compressibility factor varies with the composition of the gas, if it is a mixture, as well as with the pressure and temperature conditions imposed on the gas. According to the present invention, the optimum conditions are found by lowering the temperature and increasing the pressure, relative to ambient conditions. For natural gas, the compression ratio for this mode of transportation typically varies from 250 to 400, depending on the composition of the gas. Once the optimum pressure-temperature condition is determined for the particular gas to be transported and/or stored, the required dimensions for the storage containment system may be determined.

Calculating the compression for the gas determines the conditions where the gas will occupy the smallest possible volume. The gas equation of state determines the volume, V, for a given mass of gas m, namely:

$$V=mZ\,RT/P \qquad (1)$$

where Z is the compressibility factor, T is temperature, R is the specific gas constant and P is pressure. For a given gas composition, Z is a function of both temperature and pressure and is usually obtained experimentally or from computer models. As can be seen from the equation, as Z decreases so does V for the same mass of gas, thus the lowest value of Z for a given operating temperature is desired.

Since storage volume also decreases with T, the desired operating temperature is also considered an important factor. According to the present invention, cryogenics are to be avoided but moderately low temperatures are desirable. As temperatures decrease, metals become brittle and metal toughness decreases. Many regulatory codes limit the use of certain groups of metals to finite ranges of temperatures in order to ensure safe operation. Regular carbon steel is widely accepted for use at temperatures down to −20° F. High strength steel such as X-100 (100,000 psi yield strength) is widely accepted for use at temperatures down to about −60° F. Other high strength steels include X-80 and X-60. The selection of the steel for the storage containment system is dependant upon several design factors including but not limited to Charpy strength, toughness, and ultimate yield strength at the design temperatures and pressures for the gas. It of course is necessary that the storage containment system meet code requirements for these factors as applied to the particular application. By way of example the maximum stress level for the storage containment system is the lower of ⅓ the ultimate tensile strength or ½ the yield strength of the material. Since ½ the yield strength of X-80 and X-60 steel is less than ⅓ their yield strength, these high strength steels may be preferred over X-100 steel.

By way of example, assuming an X-80 or X-60 high strength steel for the storage containment system, the preferred storage containment system may have a lower temperature limit of −20° F. to provide an appropriate margin of safety for the preferred embodiment of the gas storage containment system, although lower temperatures may be possible depending upon the desired margin of safety and type of material used. For example, a lower temperature limit of −40° F. may be possible using a premium high strength steel such as X-100 and a smaller margin of safety.

Figure 3:
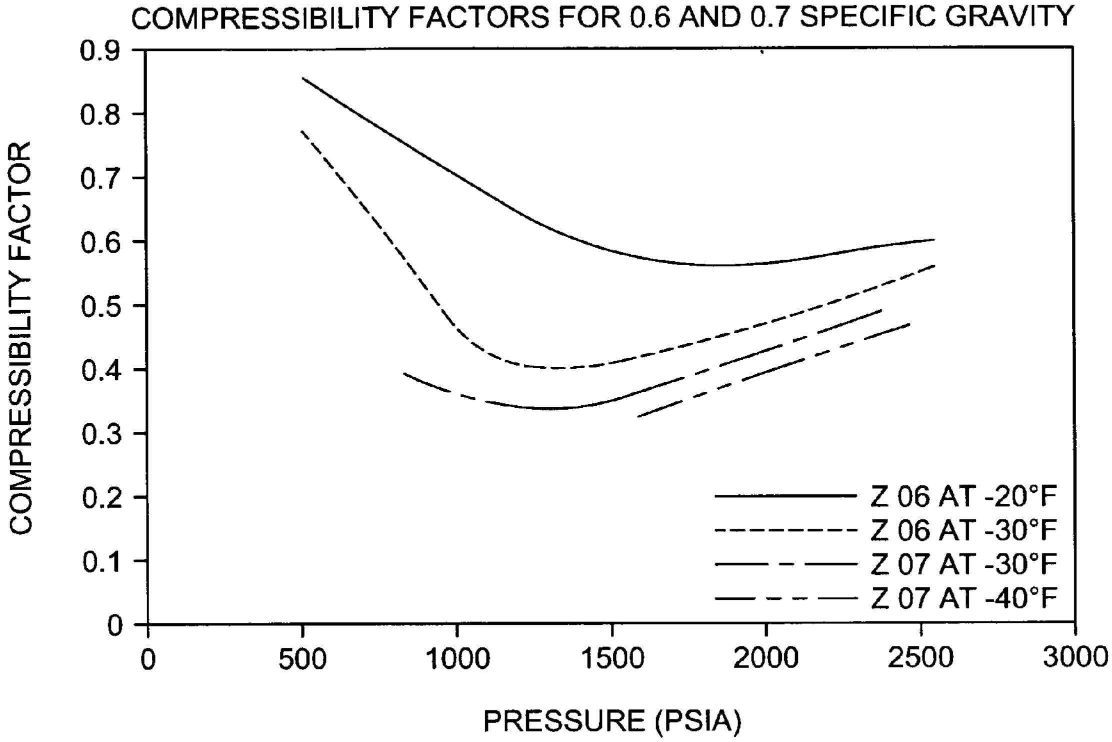
FIG. 3 is an enlarged graph of gas compressibility factor versus gas pressure for gasses with a specific gravity of 0.6 and 0.7 at −20° F., −30° F. and −40° F.

The following is a description of one preferred embodiment of the present invention for a gas having a particular composition including a specific gravity of 0.6. An X-100 high strength steel is used for the storage containment system with the preferred storage containment system having a lower temperature limit of −20° F. to provide a predetermined margin of safety for the system. FIG. 1 is a graph of the compressibility factor Z versus gas pressure for a gas with a specific gravity of 0.6. The 0.6 specific gravity is representative of that obtained from a dry gas reservoir having a composition comprising primarily methane and low in other hydrocarbons. The values of Z have been obtained from the American Gas Association (AGA) computer program developed for this purpose. The AGA methodology as applied at a temperature of −20° F., as the design temperature for the storage components, is presented in FIG. 3. Referring to FIG. 3, it is clear that the lowest value of Z, for a specific gravity of 0.6, occurs at about 1840 psia at −20° F. Based on equation (1), the minimum volume to store this gas is obtained by designing the storage components to withstand at least 1840 psia plus appropriate safety margins. These conditions give a compression ratio of approximately 265 of gas volume at standard conditions to gas volume at storage conditions.

Figure 2:
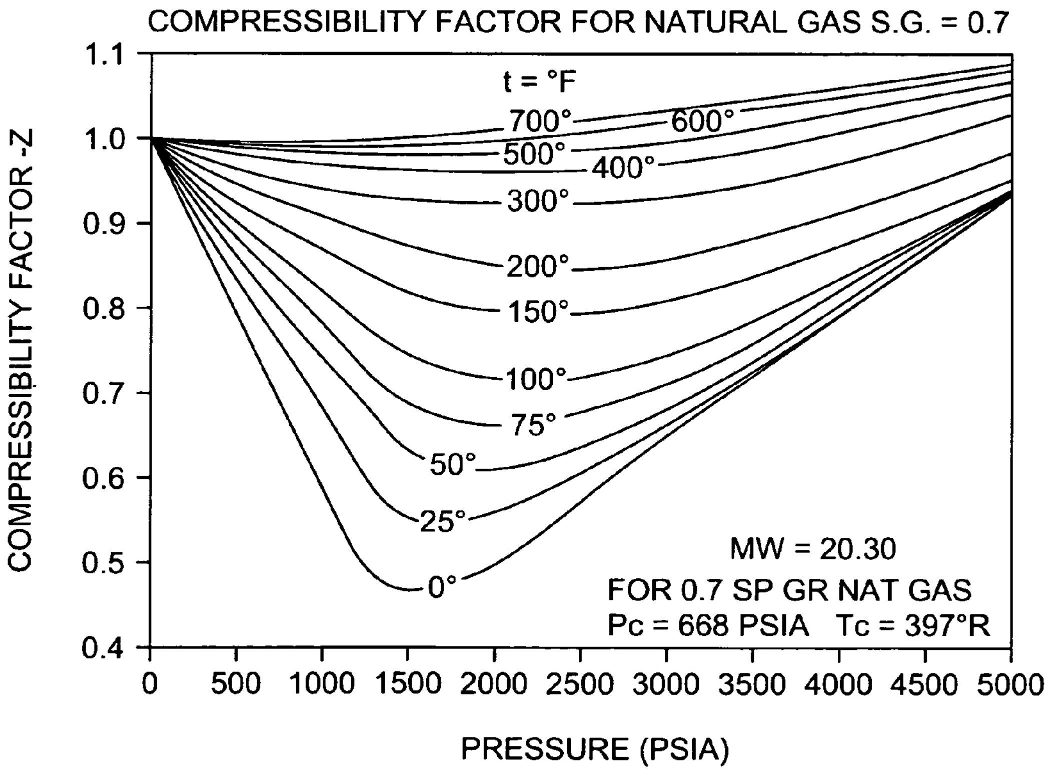
FIG. 2 is a graph of gas compressibility factor versus gas pressure for a gas with a specific gravity of 0.7.

Another example gas composition is illustrated in FIG. 2 showing a graph of the compressibility factor Z versus gas pressure for a gas with a specific gravity of 0.7. The values for Z were obtained in the same manner as FIG. 1. The temperatures of the gas displayed in FIGS. 1 and 2 go no lower than 0° F. FIG. 3 illustrates the compressibility factor for gasses of 0.6 and 0.7 specific gravity as the temperature decreases below 0° F. Now referring to FIG. 3, looking at Z versus P for a 0.7 specific gravity gas, the minimum value of Z is 0.403 and is found in the neighborhood of 1350 psia at −20° F. Thus, for the 0.7 specific gravity gas, the storage components are designed for at least 1350 psia, plus any applicable safety margin. These conditions produce a compression ratio of approximately 268. FIG. 3 also illustrates how compressibility increases as the gas temperature is reduced to even colder temperatures. For a 0.7 specific gravity gas at −30° F., a minimum value of Z is 0.36 at about 1250 psia. For the same gas at a temperature of −40° F., the value of Z decreases to 0.33 at 1250 psia. At pressures below 1250 psia the 0.7 specific gravity gas at −40° F. will become a liquid and no longer be a dense phase gas.

Figure 4:
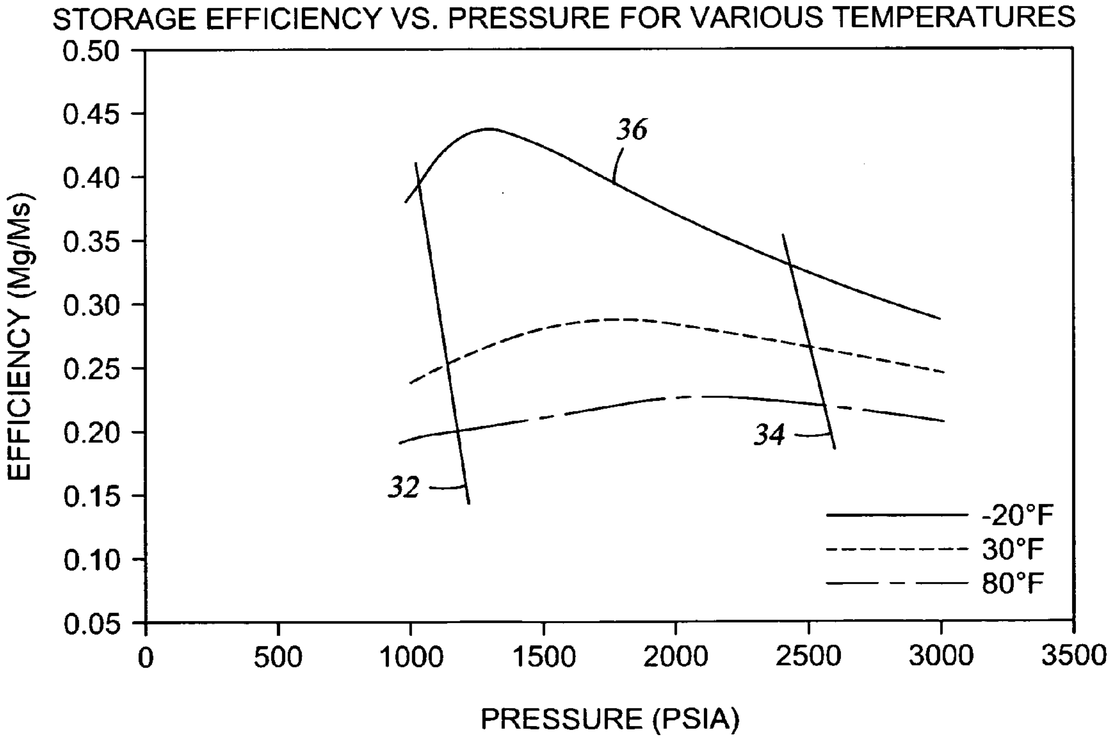
FIG. 4 is a graph of the efficiency of the gas storage system versus storage pressure at varying operating temperatures.

A key objective, and benefit, of the present invention is to increase the efficiency of gas storage systems. Specifically to maximize the ratio of the mass of the gas stored to the mass of the steel (Ms) of the storage system. FIG. 4, shows the relationship between the pressure at which the gas is stored and the efficiency of the system for various temperatures. It can be seen in FIG. 4 that, at a given pressure, as the temperature of the gas decreases, the efficiency of the storage system increases. While it is preferred that the system of the present invention be operated at point 31 that will maximize efficiency, it is understood that this may not be practical in all instances. Therefore, it is also preferred to operate the system of the present invention within a range of efficiencies, such as that illustrated on FIG. 4, and delineated by line 32 and line 34. It is also preferred that the present invention operate with efficiencies exceeding 0.3.

Still referring to FIG. 4, the preferred operating parameters for one embodiment of the present invention is represented by curve 36. This curve is representative of a gas, having a specific composition, being stored at −20° C. It is understood that as the composition of the gas varies the curve will also differ. Although it possible, and advantageous over the prior art, that the gas may be stored at any pressure falling within the range represented, it is preferred that the gas be stored at a pressure in the range defined by curves 32 and 34. Therefore, a storage system constructed in accordance with this embodiment of the present invention should be capable of storing gas at any pressure defined by this range, nominally between 1100 and 2300 psi, and at −20° C.

A method for optimizing a gas payload includes: 1) selecting the lowest temperature for the storage system considering an appropriate margin of safety, 2) determining the optimum conditions for the compression of the particular composition gas in question at that temperature, and 3) designing appropriate gas containers, such as pipe, to the selected temperature and pressure, e.g. select pipe strength and wall thickness.

It would be preferred that the system of the present invention be utilized to store and transport a gas of known, constant composition. This allows the system to be perfectly optimized for use with the particular gas and allows the system to always operate at peak efficiency. It is understood that the composition of a gas can vary slightly over time for a particular producing gas reservoir. Similarly, the gas storage and transportation system of the present invention may be utilized to service a number of reservoirs producing gases of varying composition with a range of specific gravities.

The present invention can accommodate these variances. FIG. 3 is a view of the −20° F. curves for 0.6 and 0.7 specific gravity gases. The value of Z for the 0.7 specific gravity gas has a variance of Z of less than 2% over a pressure range of about 1200 to 1500 psia at −20° F. The 0.7 specific gravity gas maintains a 2% variance from about 1150 to 1350 psia at −30° F., and the variance from 1250 to 1350 psia at −40° F. Thus, depending on the temperature of the system, the design of the storage components may be considered optimum over a range of pressures for which the compressibility factor is minimized or within this 2% variance. It is preferred to operate within this variance range but it is understood that other storage conditions may find utility in certain situations.

Therefore, although reference will be made to the use of the system of the present invention with a gas of a particular composition, it is understood that this particular composition may not be the composition actually produced from the reservoir and a system designed for use with gas of a particular composition is not limited to use solely with a gas of that particular composition. For example, decreasing the temperature slightly will allow commercial quantities of leaner gas to be stored in a containment system optimized for a rich gas.

For the gas storage containers, the preferred embodiment will use a high strength steel of at least 60,000 psi yield strength, i.e., X-60 steel. The storage component is preferably steel pipe, although other materials, including, but not limited to, nickel-alloys and composites, particularly carbon-fiber reinforced composites, may be used. Any pipe diameter can be used, but a larger diameter is preferred because a larger diameter decreases the number gas containers required in a system of a given capacity, as well as decreasing the amount of valving and manifolding needed. Large diameter pipe also allows repairs to be carried out by methods using means of internal access, such as securing an internal sleeve across a damaged area. Large diameter pipe also allows the inclusion of a corrosion, or erosion, allowance to improve the useful life of the storage container with only a minimal affect on storage efficiency. Very large pipe diameters, on the other hand, increase the wall thickness required and are more subject to collapse and damage during construction. Therefore, a pipe diameter is preferably chosen to balance the above described concerns, as well as availability and cost of procurement. According to one embodiment of the present invention, a pipe diameter of 36 inches is used.

The preferred pipe is mass produced pipe and is quality controlled in accordance with applicable standards as published by the appropriate regulatory agencies. Discussions with certain regulatory agencies indicate that the use of a maximum design stress of 0.5 of yield strength, or 0.33 of ultimate tensile strength, whichever is lower, is appropriate. This is a significant improvement over the prior art in that the normal special built storage tank construction used in some prior art methods requires a maximum design stress of 0.25 of yield strength. A design factor of 0.5 means that the structure must be designed twice a strong as required and a 0.25 factor means that the structure must be 4 times as strong. Thus the present invention can meet regulatory and safety requirements while using less steel, and thereby significantly reduce capital costs. Another advantage of the present invention is the margins of safety and levels of quality control that are inherent to mass produced, premium grade pipe.

The preferred embodiment is designed for a gas temperature of −20° F. as the temperature where the gas can be maintained in the dense phase at the storage pressure targeted. As previously discussed, standard carbon steel is widely accepted for use at temperatures as low as −20° F., while the high strength steel used in premium pipe is accepted for use at temperatures as low as −60° F. This gives a wide margin of safety in the operating temperature of the gas storage system as well as providing some flexibility in its use at temperatures below the design temperature. A further consideration is that the heavier hydrocarbons that contribute to a low Z value do not drop out when the gas is chilled to −20° F. because the gas is in the "supercritical" state, i.e., dense phase. Separate phases for natural gas do occur once the gas drops to around 1000 psia. This can be allowed to happen, outside of the primary gas containment system, when the gas is off-loaded, if it is desired to collect the heavier hydrocarbons such as ethane, propane and butane, which can have higher economic value, but is not preferred during storage and transportation as the gas is more efficiently stored as a critical phase gas.

As discussed above, the preferred embodiment uses a high strength steel for the pipe, i.e., at least 60,000 psi yield strength, and the calculations below assume that the design factor of 0.5 of the yield stress controls. The following is a calculation of the preferred wall thickness for the pipe.

Initially the mass of gas carried per mass of the gas containing pipe is maximized without regard to the other components such as the support structure, insulation, refrigeration, propulsion, etc. The mass of gas, mg that is contained in the pipe per unit length can be written as $$m_g = \frac{p_g V_g}{ZRT_g} \quad (2)$$

where $p_g$ is the gas pressure, $V_g$ is the volume of the container, Z is the compressibility factor, R is the gas constant and $T_g$ is the temperature. This mass of gas is contained in one foot length of pipe with a diameter of $D_i$ is given by $$\frac{m_g}{\text{ft}\cdot\text{pipe}} = \frac{p_g}{ZRT_g}\frac{\pi D_i^2}{4}. \quad (3)$$

In order to maximize the efficiency of the storage system, as defined by the ratio of the mass of the gas to the mass of the storage container ($m_g/m_s$), the pipe should be as light weight as possible. The hoop stress P of a thin walled cylinder is defined as $$P = \frac{2SF}{D_i}\frac{D_o - D_i}{2} \quad (4)$$

where S is the yield stress of the pipe material, F is the design factor from Table 841.114A of the ASME B31.8 Code (assumed to be 0.5 for this case), and $D_o$ is the outer diameter of the pipe. Therefore, substituting in equation 4 and using an F of 0.5, the mass of the pipe ($m_s$) can be calculated by $$m_s = \rho_s\frac{\pi}{4}(D_o^2 - D_i^2) = \frac{\rho_s\pi}{2}(D_o + D_i)\left(\frac{D_i P}{S}\right) \quad (5)$$

where $\rho_s$ is the density of the pipe material. Combining equations 2 and 5 the ratio ψ of the mass of gas $m_g$ to mass of storage system $m_s$ is can be represented by $$\Psi = \frac{m_g}{m_s} = \frac{S}{2\rho_s ZRT_g}\frac{D_i}{(D_o + D_i)} \quad (6)$$

This function was evaluated numerically for the following set of parameters:

| | | |
|---|---|---|
| S | 60 to 100 | ksi |
| F | 0.5 | — |
| R | 96.4 methane | lbf · ft/(1 bm · R) |
| | 88.91 natural gas (S.G. = 0.6) | |
| $T_g$ | 439.69 | R |
| $\rho_s$ | 490 | lbm/ft3 |

The above referenced function, v is easily evaluated numerically and is shown in FIG. 4 for three different yield stress values of S for gas. For ease of analysis the efficiency function xy can be analyzed in relation to the ratio of diameter of the pipe to the thickness of the pipe as represented by $$\frac{D}{t} = \frac{D_i}{.5(D_o - D_i)} \quad (7)$$

FIG. 4 shows how the ratio of the mass of the gas per mass of steel (defined as the efficiency) varies with the ratio of the diameter to thickness of the pipe. This type of curve is used when choosing the optimum D/t or maximum efficiency v as discussed above. As can be seen in FIG. 4, the maximum of ψ occurs at different D/t for different yield stress values; these maxima are tabulated below for materials of different yield stress.

The efficiency increases dramatically as S increases and thus it is prudent to choose the material with a high maximum yield stress, such as around 100,000 psi. For this value of the yield stress, the maximum efficiency occurs at a D/t of about 50 and is approximately 0.316 for the gas and 0.265 for the methane. But this still does not indicate the exact pipe selection; however, if D is fixed based on availability, or other considerations, the necessary wall thickness can be determined immediately. Selecting a diameter D=20 in, as an example, the wall thickness should be 0.375 in. This is a standard size and therefore is readily available; for this pipe, D/t=53.3 and the mass of gas/mass of steel is found to be 0.315, which is close to the optimum selection. The weight of this pipe is 78.6 lb/ft; the weight of the pipe with the gas is 102.79 lb/ft. The pressure of the gas at this optimum configuration is 1840 psi. Note that if the 100 ksi material is not available, or if criteria on ultimate strength limits is applicable, other optimum D/t can be selected based on material availability, but the ratio of $m_g/m_s$ will not be as high as for the 100 ksi material. Although a 20 inch pipe diameter is used here as an example, other sizes such as the 36 inch diameter pipe discussed earlier are also valid.

While the above example uses the maximum yield stress as the critical factor in choosing a material, it is understood that, when considering the applicable codes and regulations, other material properties and design factors may also be important. For example, as previously discussed, certain regulatory bodies require that the maximum principal stress not exceed 0.33 of the ultimate tensile strength of the material, thereby making the ultimate tensile stress a critical selection factor. In low temperature service, regulatory bodies also require a certain toughness characteristic of the material, as typically determined by a Charpy V-notch impact test, so that low temperature performance of the material becomes important. Also, note that additional stresses might arise due to bending caused by self weight, vehicle flexure, and thermal stresses, and although these are orthogonal to the hoop stress on which the above calculation is based, these stresses may also become an important design consideration based on the particular application.

Other design considerations also may be considered when selecting a suitable gas container and storage system. For example, since the operating stress is above 40% of the specified minimum yield stress, according to ASME B31.8 Code, Section 841.11c, the selected material should be subjected to a crack propagation and control analysis—assuring adequate ductility in the pipe and/or providing mechanical crack arrestors. Note that the pipe supports can be designed to double as crack arrestors. Additionally, the calculations thus far have been concerned only with the gas and the pipe to contain it; however, these pipes have to be stacked in a structural framework, disposed on the vehicle, provided with manifolds, pumps, valves, controls etc. for on-loading and off-loading operations, and provided with insulation and refrigeration systems for chilling and maintaining the gas at a reduced temperature. The pipes used as gas containers must also be able to resist the loads created by other gas containers and the additional equipment.

One preferred embodiment includes a 36 inch diameter pipe and a D/t ratio of 50. Once the diameter has been selected and D/t ratio calculated, then the wall thickness is determined. The compressibility factor for the gas, of course, has been included in the calculation of the ratio. Thus, in the design for a gas with a certain composition at −20° F., the equation of state calculates a preferred pressure for the compressed gas. Knowing that pressure, this provides the best compressibility factor. Thus the pipe is designed for this optimum compressibility factor at −20° F. The equation for pressure and wall thickness is then used knowing the pressure, to calculate the wall thickness for the pipe at a given diameter.

Thus, the design of the pipe is made for the pressures to be withstood at −20° F. considering the particular composition of the gas. However, there is a relatively flat area on the curve where the optimum Z factor is obtained. Thus, as shown in FIG. 3, the design pressure can be between about 1,200 and 1,500 psia, for a 0.7 specific gravity gas, without a significant variance in the compressibility factor. This allows flexibility in the composition of gas that can be efficiently transported in the gas storage system of the present invention.

It is preferred that the gas container design be optimized because of the production and fabrication costs of the storage system, as well as a concern with the weight of the system as a whole. If the gas containers are not designed for the composition of gas at −20° F., the gas containers may be over-designed, and thus be prohibitively expensive, or be under-designed for the pressures desired. The preferred embodiment optimizes the gas container design to achieve the efficiency of the optimum compressibility of the gas. The efficiency is defined as the weight of the gas to the weight of the pipe used in fabricating the gas container. In a preferred embodiment for a 0.7 specific gravity gas, an efficiency of 0.53 can be achieved when using a pipe material having a yield strength of 100,000 psi. Thus, the weight of the contained gas is over one-half the weight of the pipe.

The optimum wall thickness for a given diameter pipe may or may not coincide with a wall thickness for pipe that is typically available. Thus, a pipe size for the next standard thickness for a pipe at that given diameter is selected. This could lower efficiency somewhat. The alternative, of course, is to have the pipe made to specific specifications to optimize efficiency, i.e. the cost of the pipe for a particular composition of natural gas. It would be cost effective to have the pipe built to specifications if the quantity of pipe needed to supply a fleet of vehicles was great enough to make the manufacture of special pipe economical.

Using the equations discussed above, the wall thickness of the pipe can be calculated for storing a gas at established conditions. For storing a 0.6 specific gravity gas at 1825 psia using a 20 inch diameter pipe with an 80,000 psi yield strength, the wall thickness is in the range of 0.43 to 0.44 inches and preferably 0.436. For a pipe diameter of 24 inches the wall thickness is in the range of 0.52 to 0.53 and preferably 0.524 inches. For a pipe diameter of 36 inches, the wall thickness is in the range of 0.78 to 0.79 and preferably 0.785 inches.

For storing a 0.7 specific gravity gas at 1335 psia using a 20 inch diameter pipe with an 80,000 psi yield strength the wall thickness is in the range of 0.32 to 0.33 inches and preferably 0.323. For a pipe diameter of 24 inches the wall thickness is in the range of 0.38 to 0.39 and preferably 0.383 inches. For a pipe diameter of 36 inches, the wall thickness is in the range of 0.58 to 0.59 and preferably 0.581 inches.

The PB-KBB report, hereby incorporated herein by reference, uses an alternative method for calculating the wall thickness pipe. For 0.6 specific gravity natural gas with a pipe diameter of 24 inches, the wall thickness for a design factor of 0.5 is in the range of 0.43 to 0.44 inches and preferably 0.438 inches and for a 20 inch pipe diameter, the wall thickness is in the range of 0.37 to 0.38 inches and preferably 0.375 inches, for a pipe material having a yield strength of 100,000 psi. For 36 inch diameter pipe, the wall thickness is in the range of 0.48 to 0.50 inches and preferably 0.486 inches for a gas with a 0.7 specific gravity and is in the range of 0.66 to 0.67 inches and preferably 0.662 inches for a gas with a 0.6 specific gravity, for a pipe material having a yield strength of 100,000 psi.

The thickness ranges described above do not include any corrosion or erosion allowance that may be desired. This allowance can be added to the required thickness of the storage container to offset the effects of corrosion and erosion and extend the useful life of the storage container.

Gas Storage Container and Vehicle

Natural gas, both CNG and LNG, can be transported great distances by large cargo vehicles such as trucks and trains. In one embodiment of the present invention, the gas storage system may be constructed integral with a new construction land vehicle. The vehicle can be any size, limited by transportation regulations and economies of scale. A railroad car for a train may be sized to carry gas containers constructed using lengths of pipe. In general, the length of the pipe will be determined by transportation regulations and the need to keep proper proportionality between vehicle length, height and width. To determine the interior volume of pipe required on a vehicle, equation (1) above, is solved using a known mass of the gas, compressibility factor, gas constant, and the selected pressure and temperature.

Once the pipe parameters have been determined for the particular gas to be transported, the vehicle for the gas can now be designed and constructed taking into account the considerations heretofore mentioned. The vehicle is preferably constructed for a particular gas source or producing area, i.e., pipe and vehicle are designed to transport a gas produced in a given geographic area having a particular known gas composition. Thus, each vehicle may be designed to handle natural gas having a particular gas composition.

The composition of the natural gas will vary between geographic areas producing the gas. Pure methane has a specific gravity of 0.55. The specific gravity of hydrocarbon gas could be as high as 0.8 or 0.9. The composition of the gas will vary somewhat over time even from a particular geographic area. As mentioned above, the compressibility factor can be considered optimum over a range of pressures to adjust for slight variations in the composition. However, if a field has a variance that falls outside the range of a particular compressibility factor, heavier hydrocarbons, including crude oil, may be added to or removed from the gas to bring the composition into the design range of the particular vehicle. Thus, a vehicle designed to a particular composition gas being produced can be made more commercially flexible by adjusting the hydrocarbon mix of the gas. The specific gravity can be increased by enriching the gas by adding heavier hydrocarbon gases, or crude oil, to the produced gas or decreased by removing heavier hydrocarbon products from the gas. Such adjustments may also be made for different gas fields with different compositions.

For a particular vehicle to handle gas with different specific gravities, a reservoir of adjusting hydrocarbons may be maintained at the facility to be added to the natural gas thereby adjusting the composition of the natural gas so that it may be optimized for loading on a particular vehicle which has been designed for a particular composition gas. Hydrocarbons can be added to raise the specific gravity. The reservoir of hydrocarbons may be located at the particular destination where the natural gas is on-loaded or off-loaded.

For example, suppose natural gas having a specific gravity of 0.6 is to be loaded on a vehicle designed for gas having a specific gravity of 0.7. Propane may be acquired and mixed, at approximately 17% by weight, with the 0.6 natural gas, creating an enriched gas that is loaded onto the vehicle. Then when offloading, as the enriched gas expands and cools, the propane will drop out because it will liquefy. That propane could then be put back onto the vehicle and used again at the original on-loading destination. The capacity to transport natural gas is increased by 41% due to adding propane to the 0.6 specific gravity natural gas. Thus, transporting the propane back and forth can be cost effective. Having a reservoir of propane to adjust the specific gravity of the natural gas may well be more cost effective as compared to building a new vehicle just to handle 0.6 specific gravity natural gas.

In one embodiment of the present invention, the pipe for the compressed natural gas is used as a structural member for the vehicle. The pipe is attached to support members which in turn are attached to the carriage of the vehicle. This produces a very rigid structural design. By using the pipes as a part of the structure, the amount of structural steel normally used for the vehicle is minimized and reduces capital costs. A bundle of pipes together is very difficult to bend, thus adding stiffness to the vehicle. It is desirable to limit bending deflection because it places wear and tear on the pipe and vehicle. Bending deflection is defined as deviation from a horizontal straight line.

Figure 7:
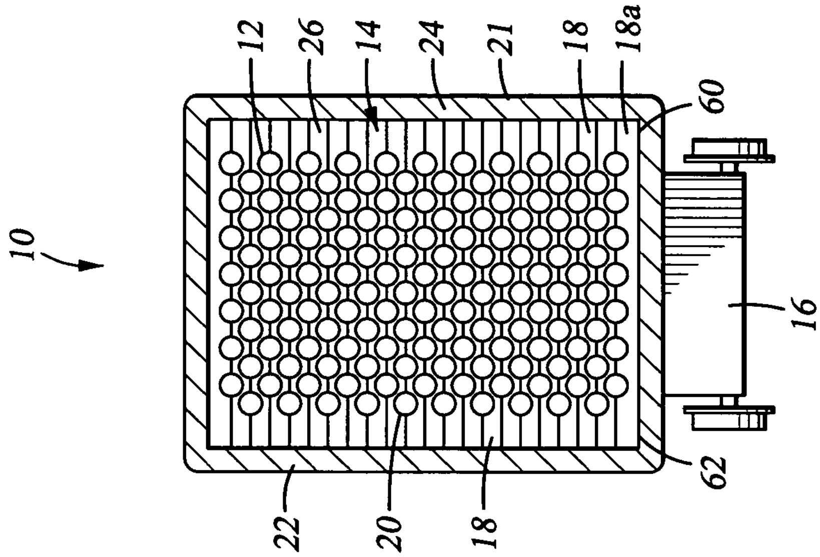
FIG. 7 is a cross sectional view of the width of the vehicle shown in FIG. 6 in accordance with the present invention showing the support members of FIG. 10.
Figure 6:
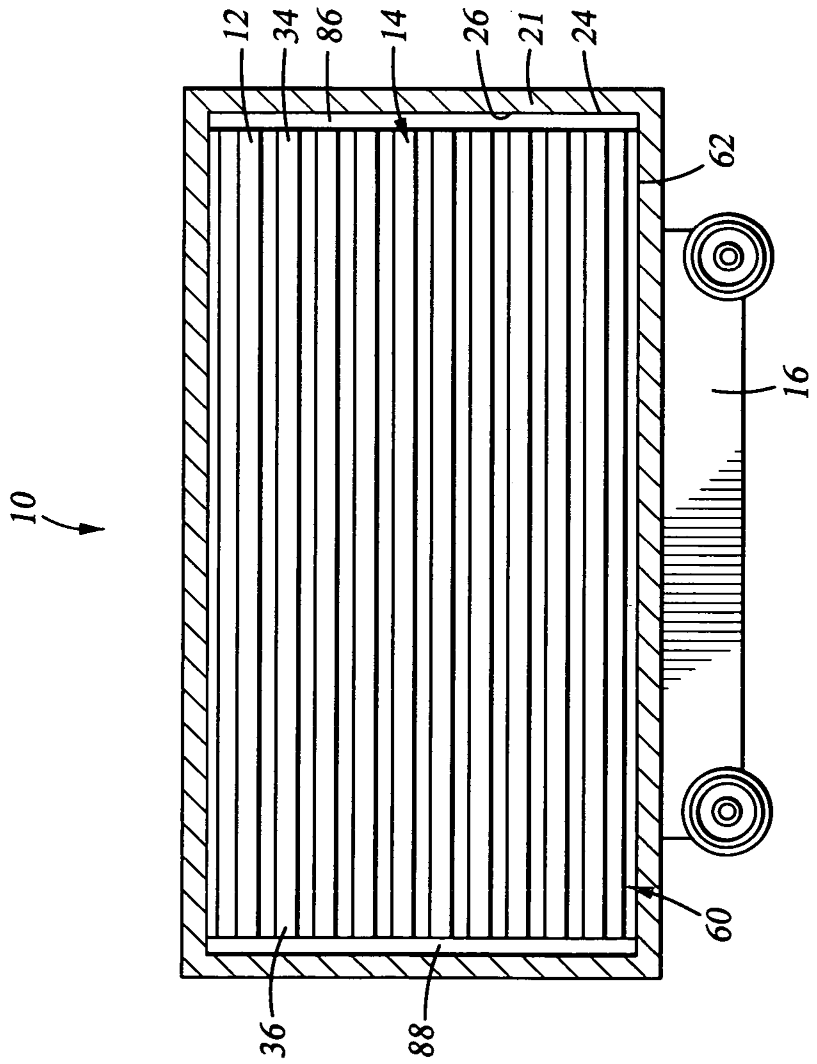
FIG. 6 is a cross sectional view of the length of a vehicle, such as a train car, in accordance with the present invention showing the gas storage system mounted on the train car with gas storage pipe.

Referring now to FIGS. 6 and 7, there is shown a railroad car 10 built specifically for the preferred pipe 12 designed to transport a particular gas having a known composition to be on-loaded at a particular site. As for example, the pipe may be 36" diameter pipe having a wall thickness of 0.486 inches for transporting natural gas produced at a given gas field and having a specific gravity of 0.7. The pipe 12 forms part of the carriage structure of the train car 10 and includes a plurality of lengths of pipe forming a pipe bundle 14 housed on the carriage 16 of the train car 10. It should be appreciated, however, that the pipe may be housed in other types of vehicles without departing from the invention.

Cross beams 18 are used to support individual rows 20 of pipe 12 and cross beams 18 are affixed to a frame 21 which forms a part of the structure of the train car 10. Cross beams 18 extend across the beam of the train car 10 to provide the structural support for the frame 21. The train car 10 is built using the cross beams 18 to hold the individual pieces of pipe 12. The bundle of pipes 14 has a cross section which conforms to the dimensions of the train car 10.

Figure 5:
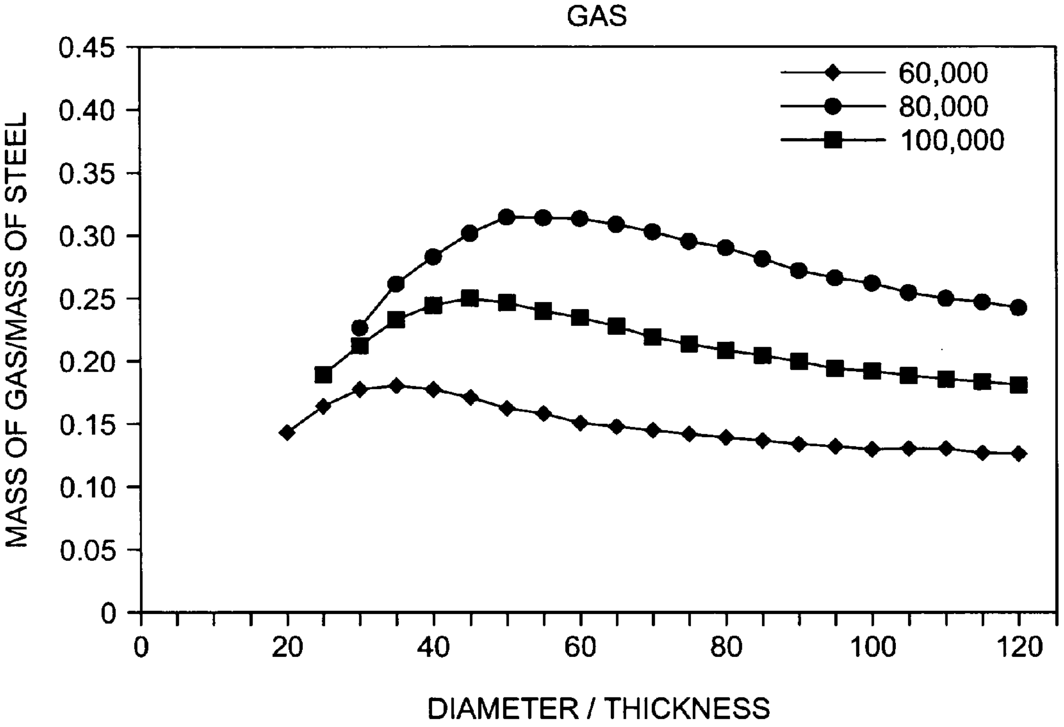
FIG. 5 shows how the ratio of the mass of the gas per mass of steel varies with the ratio of the diameter per thickness of the pipe when based on the optimized compressibility factor for a specific gravity gas.

FIG. 5 shows that the pipe bundle 14 extends nearly the full length of the train car 10. It should be appreciated that there will be space adjacent the ends 34 and 36 of the pipes 12 for manifolds 86, 88 and related valving, hereinafter described, as well as room to manipulate the valving and manifolding.

Encapsulating insulation 24 extends around the bundle of pipes 14 and extends to the outer wall 26 formed by the frame 16 of the train car 10. There is insulation along the bottom and around the bundle of pipes 14. The entire bundle 14 is wrapped in insulation 24. Insulation is required to limit the temperature rise of the gas during transportation. A preferred insulation is a polyurethane foam and is about 12-24 inches thick, depending on planned travel distance. When the entire bundle of pipes 14 is wrapped in insulation 24, the temperature rise may be less than ½° F. per thousand miles of travel.

Figure 8:
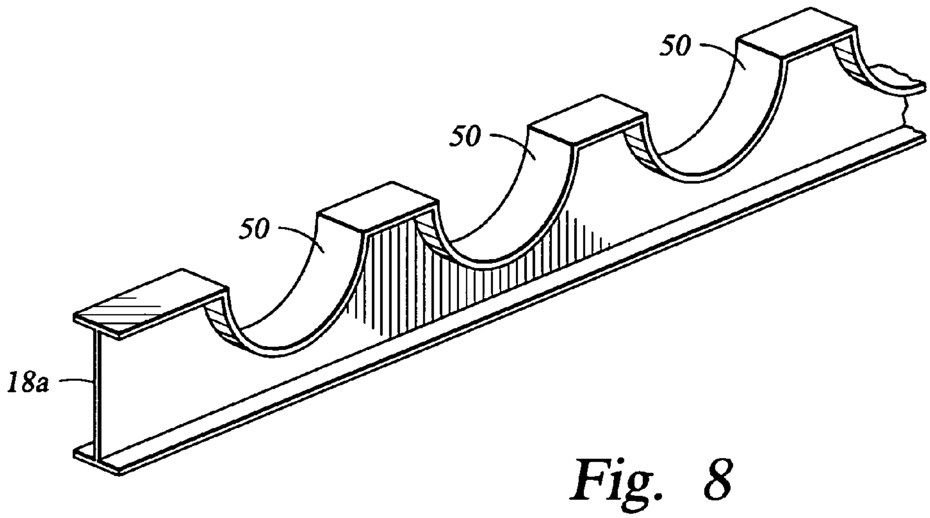
FIG. 8 is a perspective view of one embodiment of a pipe support system showing a base cross beam support for supporting gas storage pipe shown in FIG. 7.
Figure 9:
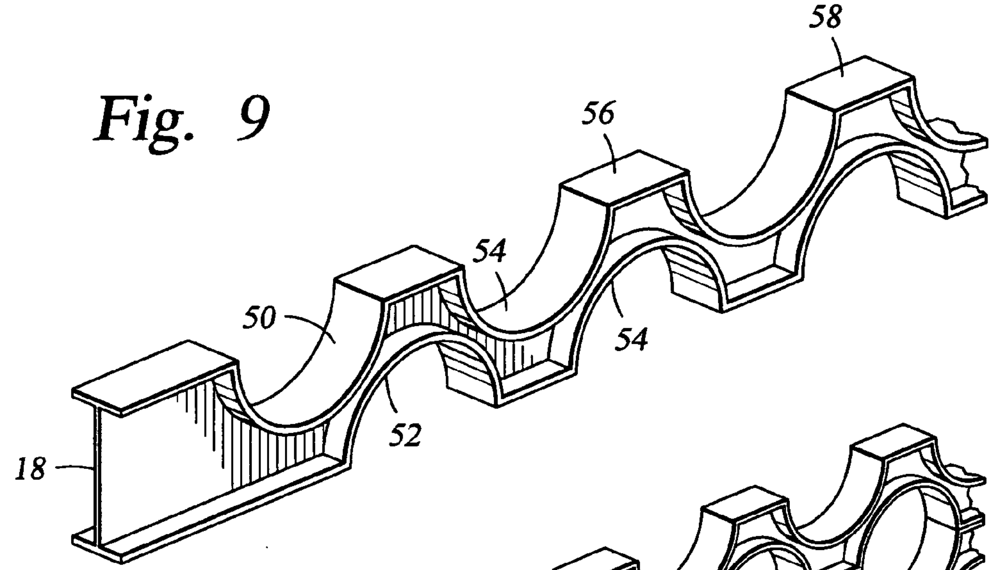
FIG. 9 is a perspective view of a standard cross beam of the pipe support system of FIG. 8 for supporting and torquing down gas storage pipe shown in FIG. 7.
Figure 10:
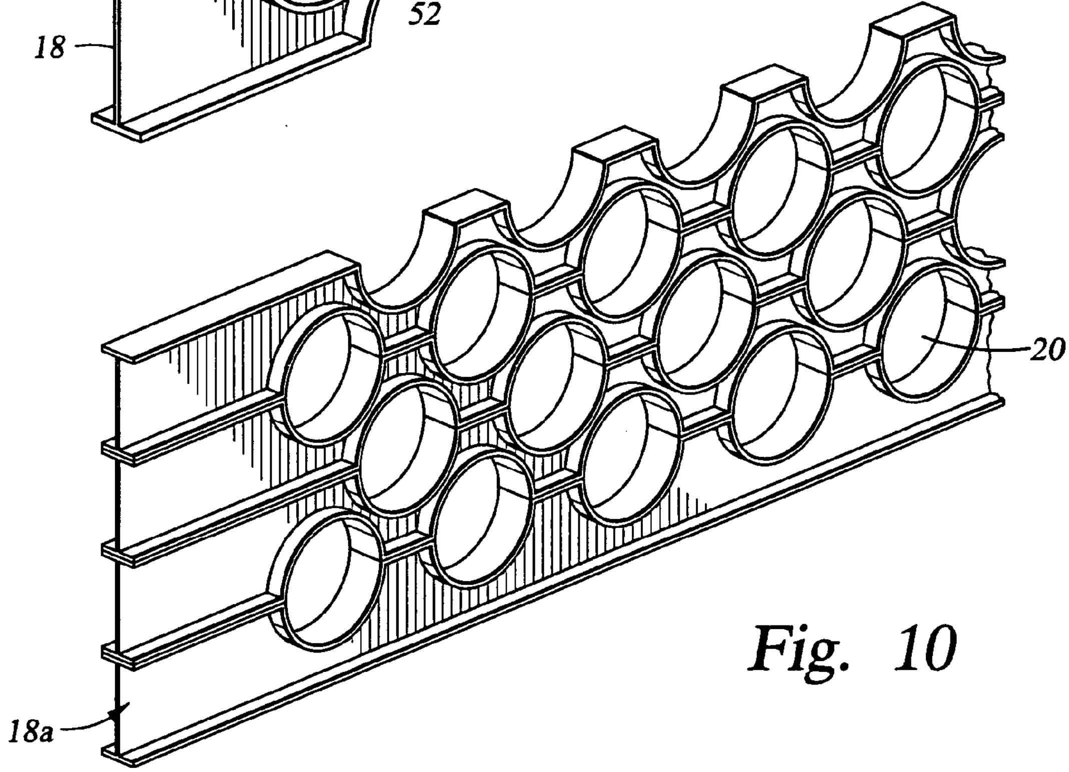
FIG. 10 is a perspective view of the support members shown in FIG. 7 being constructed in accordance with the present invention.

As shown in FIG. 7, the pipes 12 housed between cross-beams 18 form pipe bundles 14. The pipe 12 is laid individually onto cross beam 18 to form pipe rows 20. FIGS. 8-10 show one embodiment of cross beams 18. Bottom cross beam 18*a* shown in FIG. 8 is a bottom or top cross beam while FIG. 9 shows the typical intermediate cross beam 18 having alternating arcuate recesses forming upwardly facing saddles 50 and downwardly facing saddles 52 for housing individual lengths of the pipe 12. A coating or gasket 54 may line each saddle 50, 52 to seal the connection between adjacent saddles 50, 52. One embodiment includes a Teflon™ sleeve or coating to serve as the gasketing material. It should also be appreciated that a gasketing material 56 may be used to seal between the flat portions 58 of cross beams 18. The pipes 12 resting in the mated C-shaped saddles 50, 52 create a sealable connection.

Cross beams 18 are preferably I-beams. An alternative to using an I-beam is a beam in the form of a box cross section formed by sides made of flat steel plate. The box structure has two parallel sides and a parallel top and bottom. Saddles 50, 52 are then cut out of the box structure. The box structure has more strength than the I-beam. However, the box structure is heavier and more difficult to manufacture.

The individual pipes 12 are received in the upwardly facing saddles 50 and, after a row 20 of pipes 12 is installed, a next cross beam 18 is laid over row 20 with the downwardly facing saddles 52 receiving the upper sides of the pipes 12. Once the pipe 12 is housed in mating C-shaped, arcuate saddles 50, 52 of two adjacent cross beams 18, the cross beams 18 are clamped together and connected to each other. FIGS. 7 and 10 show the beams 18 stacked to form a bulkhead wall 40.

There are two methods for securing the pipe 12 between the cross beams 18 to form bulkheads 40, one is to weld, or otherwise permanently attach, the pipe 12 to the cross beams 18 to make the entire bundle rigid and the other is to bolt the adjacent cross beams and allow the pipe 12 to move between the cross beams 18. Because the compressed natural gas is to be maintained at a temperature of −20° F., the pipe 12 is installed at a temperature of 30° F. For a pipe length of 50 feet, the strain over that temperature difference is minimal. Thus, if the temperature of the pipe 12 goes from 30° F. to 80° F., there is hardly any expansion from the mid-point to the free end of the pipe 12.

Since there is relatively no expansion with respect to the length of pipe 12, neither welding or torquing suffer any expansion problems. Therefore in welding the cross beams 18, when the pipe 12 cools down, the strain is taken in the pipe 12 and by the cross beams 18. Alternatively, if the pipe 12 is not welded to the cross beams 18, the pipe 12 is laid in the cross members 18 in compression and then it is torqued down. The cross beams 18 are bolted together, securing the individual pieces of pipe 12. This provides a frictional engagement between the pipe 12 and the cross beams 18, and the pipe 12 is allowed to expand and contract with the temperature. For non-welded connections, it is preferred that some friction reducing material be present in the saddles either as a coating or an inserted sleeve to relieve some of the friction. One such example is a Teflon™ coating.

Figure 11:
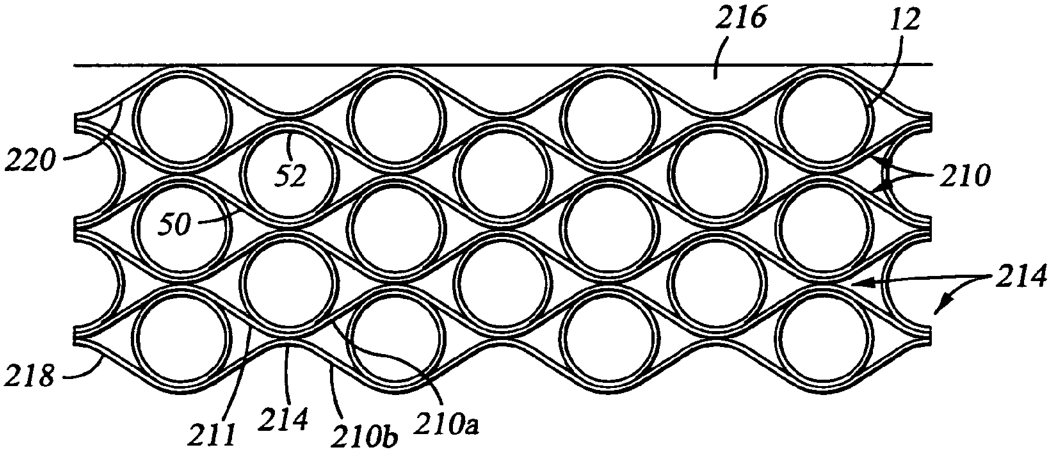
FIG. 11 is a cross sectional view of another embodiment of a pipe support system.

Referring now to FIG. 11, another embodiment of a pipe support system is illustrated. This embodiment uses straps 210 formed from steel plate so as to conform to the outside curvature of the pipes 12. The strap 210 is formed in a roughly sinusoidal pattern with a radius of curvature approximately equal to the outside diameter of the pipe 12 forming upwardly and downwardly facing saddles 50, 52 so the pipes 12 lay substantially side by side. The straps 210*a* are welded at contact points 214 to adjacent straps 210*b* creating an interlocked structure providing exceptional structural properties. One effect of the interlocked structure is that the Poisson's ratio of the entire structure 216 approaches one, therefore causing the stresses applied to the hull structure 16 to be absorbed laterally as well as vertically. Even though the use of straps 210 allow fewer pipes per tier, the tiers themselves are packed more tightly allowing a greater number of tiers and therefore the system includes more pipes per cross-sectional area of the system.

The straps 210 are preferably constructed from the same material as the pipes 12 are or from a similar material that is suitable for welding, or otherwise attaching, where the straps come into contact with each other. A preferred embodiment of the strap 210 is constructed from steel plate having a thickness of 0.6" with each strap being approximately 2' wide. The number of straps 210 per tier decreases with height because of the corresponding decrease in weight being supported by the straps. Spacers can also be used where pipe spans become too long.

In this embodiment the pipes 12 are not welded to the straps 210 and are allowed to move independently. Because of this movement, the interface between the pipe 12 and the strap 210 is fitted with a low-friction or anti-erosion material 211 to prevent abrasion and smooth out any mismatches between the pipe 12 and the strap 210. A continuous sheet of material may be included between tiers to act as a barrier if a tier develops a leak. This continuous sheet could be integrated into the straps 210, and be constructed from metal or a synthetic material such as Kevlar™, or a membrane material.

The ends of the straps 210 are preferably rigidly connected to the frame 16 or container/enclosure 21 containing the pipe bundle. The plurality of straps 210, and the supported pipes 12, contribute to the overall stiffness of the carriage 16. The pipes 12 themselves are not welded to the straps 210 and therefore are allowed to bend, expand, and contract as required. It is preferred that each pipe 12 move independently of other pipes in response to the movement of the train car 10. This allows each pipe to move longitudinally in response to the stretching, bending, and torsion of the train car 10. Support for the weight of the pipe is provided both by the straps, which form an interlocking honeycomb structure, and the by the compressive strength of the pipe.

Manifold

Figure 12:
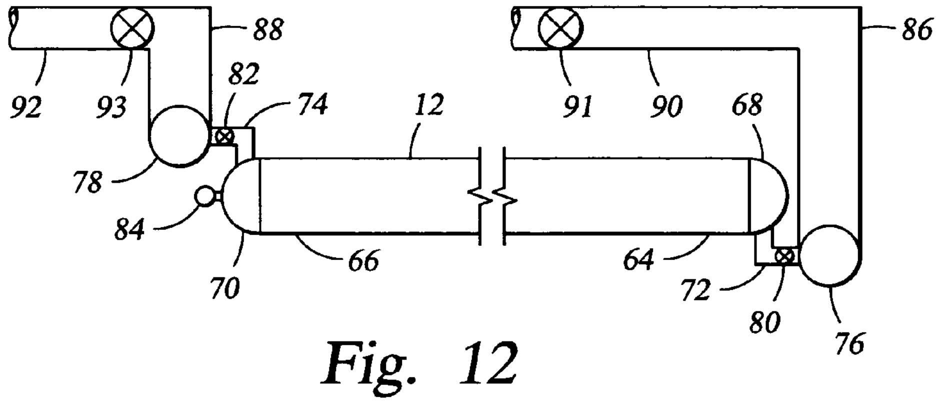
FIG. 12 is a schematic, partly in cross section, of a manifold system for the gas storage pipe of FIG. 7.

Referring now to FIG. 12, each of the ends 64, 66 of the pipes 12 are connected to a manifold system for on-loading and off-loading the gas. Each pipe end 64, 66 includes an end cap 68, 70, respectively. A conduit 72, 74 communicates with a column manifold 76, 78, respectively. In a preferred embodiment, the pipe ends 64, 66 are hemispherical and conduits 72, 74 are connected to caps 68, 70, respectively, which extend to a tier manifold.

Individual banks or tiers of pipes 12 communicate with a tier manifold 86, 88 at each end thereof. The plurality of pipes 12 which make up the tier may include any particular set of pipes 12. The tiers are principally selected to provide convenience in on-loading and off-loading the gas. For example, one tier manifold may extend across the top row 20 of pipes 12 such that the top row 20 of pipes 12 would form one tier. The outside rows 20 of pipes 12 may be manifolded into a separate tier in case of collision. The bottom rows 20 of pipe 12 may also be in a separate tier manifold. This allows the outside pipes 12 and bottom pipes 12 to be shut off. The other tiers of pipes may include any number of pipes 12 to provide a predetermined amount of gas to be on-loaded or off-loaded at any one time.

One arrangement of the manifold system may include tier manifold 86, 88 extending across the ends 64, 66, respectively, of the pipe 12 with tier manifolds 86, 88 communicating with horizontal master manifolds 90, 92, respectively, extending across the beam of the train car 10 for on-loading and off-loading. Each tier of pipes has its own tier manifold with all of the column manifolds communicating with the master manifolds 90, 92 for on-loading and off-loading.

Horizontal manifolds have the advantage of keeping the train car 10 in relative balance. Thus horizontal manifolds are preferred. The master manifolds 90, 92 are preferably located on opposite ends of the storage system for simplicity of piping and conservation of space. One master manifold 90, 92 is used for an incoming displacement fluid for off-loading and the other master manifold 90, 92 is used as an outgoing manifold for offloading the compressed gas. The horizontal master manifolds 90, 92 are the main manifolds which extend across the vehicle 10. The master manifolds 90, 92 are attached to the base system for on-loading and off-loading the gas. Master valves 91, 93 are provided in the ends of master manifolds 90, 92 for controlling flow on and off the railroad car 10.

Construction Method

A system constructed in accordance with the present invention can be constructed in a variety of methods, several of which are presented here to illustrate the preferred methods of constructing pipe storage systems. A new vehicle can be specially constructed to carry a storage system for CNG. In this embodiment the CNG system is integral to the structure and stability of the vehicle. Alternatively, a CNG system can be constructed as a modular system functioning independently of the vehicle on which it is carried. In yet another alternative an old vehicle can be converted for use in transporting CNG where the structure of the CNG storage system may or may not be an integral component of the vehicle's structure.

Referring now to FIGS. 6 and 7, in constructing a new railroad car 10, a base structure 60 with base plates 62 is installed on the top of the carriage 16. A bottom beam 18*a*, such as shown in FIG. 7, or strap 210, such as shown in FIG. 10, is then laid and affixed onto each of the base plates 62. Once the initial set of bottom cross beams 18*a* or straps 210 are in place on top of the base structure 60, then individual completed lengths of pipe 12 are lowered by cranes and laid in the upwardly facing saddles 50 formed in beams 18 or straps 210. Once the entire initial row 20 of pipes 12 have been laid on the initial set of bottom cross beams 18*a* or straps 210, then a set of cross beams 18, such as shown in FIG. 8, or straps 210 are laid and installed on top of the initial row 20 of pipes 12 with the downwardly facing saddles 52 receiving the individual pipes 12 in row 20 thereby capturing each of the individual lengths of previously laid pipe 12 between the two cross beams 18, 18*a* or straps 210. The adjacent cross beams 18, 18*a* or straps 210 are then either welded or bolted together.

It is preferred that the pipe 12 be installed while the pipe 12 is at a temperature of 30° F., assuming that the cargo temperature will be −20° F. and the expected ambient outside temperature will be 80° F. Unless the train car 10 is being built at a location where temperatures are already 30° F. and cooling the pipe is unnecessary, the pipe 12 is cooled by passing coolant through each piece of pipe 12 as it sits in the cross beam 18 or strap 210 but before it is fixed in place in the train car 10. Nitrogen may be used as the coolant to cool the pipe to approximately 30° F. This causes the temperature of the pipe 12, when it is installed to be at a temperature of 30° F. so that expansion or contraction of the pipe 12 is limited as the temperature ranges from −20° F. to possibly as much as 80° F.

The cross beams 18 or straps 210 and rows 20 of pipe 12 are continually laid onto the carriage 16 until all pieces of pipe 12 are laid horizontally into the train car 10. The individual lengths of pipe 12 are affixed to the cross beams 18 or straps 210 after the pipe 12 has been laid onto the train car 10.

The lengths of pipe 12 are preferably welded at a pipe manufacturing plant using plant machines to weld the pipe. This is preferred because the quality of the welds are better in the plant as compared to field welding. The pipe 12 is also tested at the manufacturing plant before it is moved to the facility of the construction of the train car 10. The pipe 12 is transported on trolleys and individual pieces of pipe 12 are then set into the saddles 50 in the cross beams 18 or straps 210 mounted on the carriage hull 16 of the train car 10. Each of the rows 20 are individually filled with pipe 12 and the cross beams 18 or straps 210 are laid until the train car 10 is completely filled with diameter pipe. After the pipe has been installed, the remaining frame 21 and insulation 24 are installed to enclose the pipe bundle 14.

Figure 13:
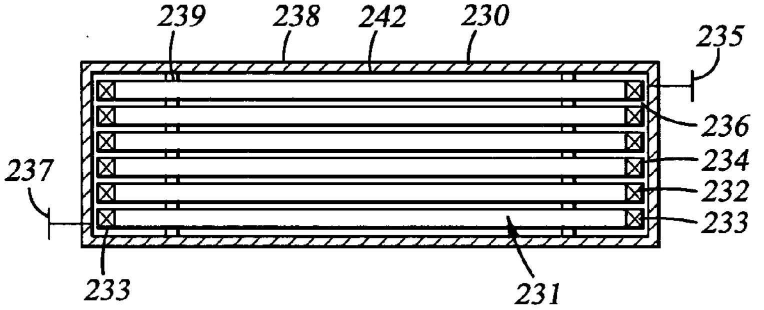
FIG. 13 is a side elevational view of a horizontal pipe modular unit having a pipe bundle independent of the vehicle structure which can be off-loaded from the vehicle or used as an independent gas storage system.
Figure 14:
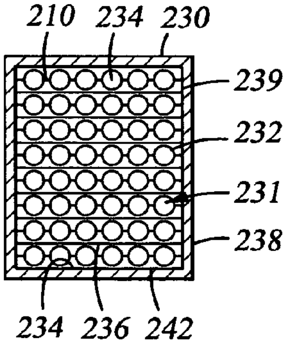
FIG. 14 is a cross sectional view of the pipe modular unit shown in FIG. 13.

Referring now to FIGS. 13 and 14, another embodiment of the present invention includes a gas storage system constructed as a self-contained modular unit 230 rather than as a part of a vehicle. The preferred modular unit 230 includes a plurality of pipes 232, forming a pipe bundle 231, with pipes 232 being substantially parallel to each other and stacked in tiers. The pipes 232 are held in place by a pipe support system, such as straps 210 having ends connected to a frame 238 forming a box-like enclosure around pipe bundle 231, and having a manifold 233, similar to the manifold system shown in FIG. 12, connected to each end of pipes 232. It should be appreciated that the cross beams 18 of FIGS. 7 and 8 may also be used as the pipe support system. The enclosure 238 isolates the pipe bundle 231 from the environment and provides structural support for the piping and pipe support system. The enclosure 238 is lined with insulation 234 thereby completely surrounding pipe bundle 231 and is filled with a nitrogen atmosphere 236. The nitrogen may be circulated and cooled for maintaining the proper temperature of the pipes 232 and stored gas. The enclosure may be encapsulated by a flexible, insulating skin of panels or semi-rigid, multi-layered membrane that can be inflated by nitrogen and serve as insulation and protection from the elements.

The size and design of the modular unit 230 is primarily determined by the vehicle that will be used to transport the modular unit. In a preferred embodiment of the present invention, the modular unit 230 is transported on the carriage of a train car 10 or on the bed of a truck.

Figure 15:
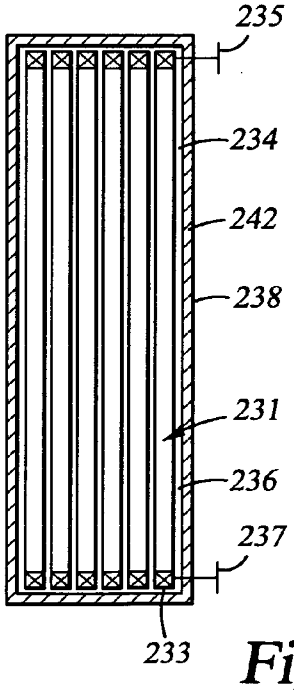
FIG. 15 is a side elevational view of a vertical pipe modular unit.
Figure 16:
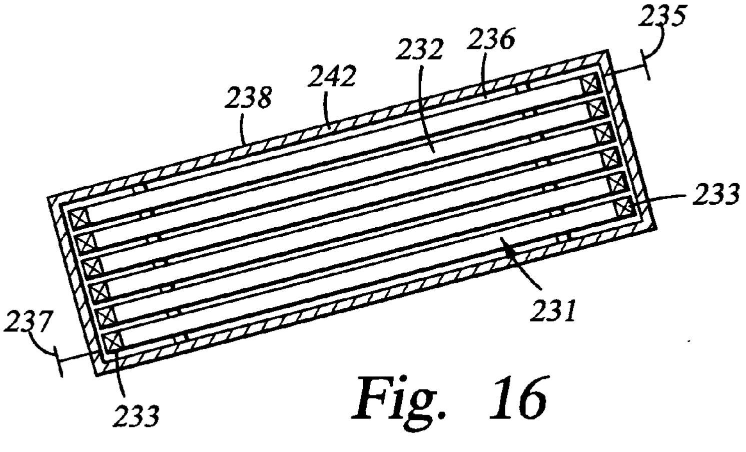
FIG. 16 is a side elevational view of a tilted pipe modular unit.

In an alternative embodiment, the modular units 230 described above could be constructed with the pipes oriented vertically. FIG. 15 illustrates the use of the modular unit 230 in a vertical orientation. The height of the unit 230 would be limited because of increased stability problems as the height of the structure increased. The vertical modular units 230 may also be constructed so as to be independent of each other and of the vehicle in order to allow the loading and unloading of the unit 230 as a whole. FIG. 16 illustrates the modular unit 230 in a tilted orientation to assist in off-loading the gas as hereinafter described. It should be appreciated that modular unit 230 may be disposed on the vehicle in a preferred orientation such as horizontal or vertical. It is preferable to construct as long a length of pipe as possible in the controlled conditions of a steel mill or other non-shipyard environment in order to maintain quality and reduce costs.

Safety Systems

After construction of the modular unit, all of the air surrounding the pipe bundle is displaced with a nitrogen atmosphere. The enclosure in the modular unit is bathed in nitrogen. One of the primary reasons for maintaining a nitrogen atmosphere is that it protects against corrosion of the pipes 12.

Further, the nitrogen provides a stable atmosphere in each enclosure 238 which can then be monitored to determine if there is any leaking of gas from the pipes 12. In the preferred embodiment, a chemical monitor is used to monitor the enclosure 238 to detect the presence of any leaking hydrocarbons. The chemical monitoring system is continually operating for leak detection and monitoring of system temperature.

It is anticipated that the possibility of a collision of sufficient magnitude to rupture the modular unit 230 and produce an escape route for leaking storage containers is very low. As a part of the design, the enclosure 238 is encased in a wall of some insulating foam 24. In the preferred embodiment, a polyurethane foam 24 will be used having a thickness of about 12-24 inches, depending on application. This not only serves to keep the enclosure 238 sufficiently insulated, but creates an added protective barrier around the storage pipes 12. A collision would have to not only rupture the enclosure 238 but also the thick polyurethane barrier 24.

A flare system 104 may also be made a part of the modular unit 230 and communicates directly with the manifolds 76, 78 or directly with the pipes 12 as necessary. For example, if it is necessary to bleed some of the natural gas off, such as because the vehicle has been stranded and the temperature of the gas can not be maintained in the pipes 12, the natural gas is bled off through the separate flare system 104, without disturbing the nitrogen in the enclosure 238.

Testing

One method of testing and inspecting the pipes is to send smart pigs through each of the pipes. These smart pigs examine the pipe from the inside. Another method is to pressurize the pipes when they are full of the displacing liquid during an off-loading procedure. The pressure can be monitored to test the integrity of the pipe.

On-Loading Method

Separate manifold systems are used for both on-loading and off-loading the gas. When the gas storage system is loaded with gas for the very first time, natural gas is pumped through the pipe and back through a chiller to slowly cool the pipe to a −20° F. The structure may also be cooled by cooling the nitrogen blanket surrounding the structure. Once the pipe is chilled down, the inlet valves 91, 93 are closed and the natural gas is compressed within the tiers of pipe. Both sets of manifolds 90, 92 could be used.

If, nevertheless, it is desired to avoid the drop in temperature of the gas in the pipe initially, the natural gas can be pumped into the pipe at a low pressure. The low pressure natural gas expands but will not chill the pipe enough to cause thermal shock or to over pressure the pipe at these low pressures. As the gas storage system continues to be loaded with natural gas, the injection pressure of the natural gas is raised to the optimum pressure of 1,800 psi, while cooling to below −20° F. Ultimately the compressed gas is at a temperature of −20° F. and a pressure of 1,800 psi.

Off-Load Method

Referring now to FIGS. 12 and 18, the manifold system is used for off-loading by pumping a displacement fluid through the master manifold 90 and into the tier manifolds 86 and column manifolds 76. The valves 145 and 121 are open to pump the displacement fluid through the conduits 72 and into one end 64 of a pipe 12. Simultaneously, the valves 91 and 122 at the other end 66 are opened to allow the gas to pass through conduit 74 and into column manifold 78 and tier manifold 88. The displacement fluid enters the bottom of the end cap 68 and the conduit 72 and the offloading gas exits at the top of end cap 70 and conduit 74 at the other end 66 of the pipe 12. The displacement fluid enters the low side and the gas exits the top side of the pipe 12. Thus during off loading, displacement fluids are injected through one tier manifold 86 forcing the compressed natural gas out through the other tier manifold 88. As the displacing liquid flows into one end of the pipe, it forces the natural gas out the other end of the pipe.

One preferred displacement fluid is methanol. By tilting the storage system, or inclining the gas containers, the interface between the methanol and the natural gas is minimized thereby minimizing the absorption of the natural gas by the methanol. Methanol hardly absorbs natural gas under standard conditions. However, because of the high pressures, there may be some absorption of natural gas by the methanol. It is desirable to keep the absorption to a minimum. Whenever natural gas does get absorbed by the methanol, it is removed in the storage tank by compressing it from the gas cap at the top of the tank. Tilting the gas storage container for off-loading would not be used if the displacing fluid was completely unable to absorb the gas. An alternative displacement fluid is ethanol. The preferred displacement fluid has a freezing point significantly below −20° F., a low corrosion effect on steel, low solubility with natural gas, satisfies environmental and safety considerations, and has a low cost.

One preferred method includes tilting the vehicle lengthwise at the off-loading station. This is done to minimize surface contact between the displacement fluid and the natural gas. By tilting the vehicle, the contact area between the displacement fluid and the gas are slightly larger than the cross section of the pipe. The vehicle would be tilted approximately between 1°-3°. Alternatively, the storage structure may be inclined at an angle while the vehicle is maintained level.

Another preferred method would be to construct the storage system so that the pipes are always at an angle to the horizontal. Vertical storage units such as in FIG. 14 also have the advantage of decreasing the absorption of the gas into the transfer liquid because the contact area between the transfer liquid and the stored gas is minimized. It is preferable to incline the pipes at enough of an angle to overcome any natural sag in the pipe between the supports in order to ensure that any liquid caught in the sagging pipe will be removed.

In reference to FIG. 17, the modular storage pack is shown with an inlet 237 and outlet 235 on each end of the storage pipe. The outlet 235 on one end is at the top of the pipe bundle while the inlet 237 on the opposite end is at the lower end of the pipe bundle. The lower inlet 237 is used to pump transfer liquid into the pipe bundle while the upper outlet 235 is used for the movement of gas products. This placement of the inlet and outlet helps minimize the interface between the transfer liquid and the product gas.

The feature can be further enhanced by inclining the storage pipes so that the gas outlet 235 is at the high point and the liquid inlet 237 is at the low point. Referring to FIG. 15, this inclination can be achieved by inclining the module unit or by installing the individual pipes at an angle during construction. This angle could be any angle between horizontal and vertical with an larger angle maximizing the separation between the transfer liquid and the product.

The receiving station may include means for tilting the vehicle. The means for tilting the vehicle may include a hoist for lifting one end of the vehicle or a crane or a fixed arm that swings over one end of the vehicle. The fixed arm would have a hoist for the vehicle. The displacement fluid and gas would form an interface which pushes the gas to the off-loading manifold.

It is possible that in the transport and storage of certain gases and liquids, the natural separation between the product and the displacing liquid, i.e. density, miscibility, surface tension, etc., is not sufficient to prevent undesired mixing of the two components. In such cases, offloading the gas using a displacement liquid may cause some concern in that the displacing liquid may mix with the gas. In order to prevent this from happening, a pig may be placed in the pipe to separate the displacement liquid from the gas.

Referring now to FIGS. 19 and 20, pigs 220, such as simple spheres or wiping pigs, can be installed within each pipe 222. Pigs 220 of this type are commonly used in pipelines to separate different products. The pig 220 is located at one end of the pipe 222 with the major end of the pipe 220 being filled with gas 224. The displacement liquid 226 is then introduced in the end of the pipe 222 with the pig 220. As the displacement liquid enters the pipe 222, the pig 220 is forced down the length of the pipe 222 pushing the gas 224 ahead of it until the pig 220 reaches the other end of the pipe 222 and the gas is offloaded from the pipe 222.

When the storage pipe is essentially evacuated, the liquid pumping stops and valving switches over to a low pressure header allowing the available pressure to push the pig back to the first end of the pipe 222 pushing out all of the displacement liquid 226. One disadvantage is that there may be additional horsepower requirements for the pump to push the displacement liquid 224 against the pig 220 to move it at an adequate velocity to maintain efficient sweeping. The pipes will also have to be fitted with access for the maintaining and replacing of pigs 220.

The receiving station includes a tank full of liquid to be used to displace the natural gas. Even though the vehicle or pipe bundle is tilted, some of the natural gas will be absorbed by the displacement liquid. When the displacement liquid returns to the storage tank, the natural gas which has been absorbed by the displacement liquid will be scavenged off.

Alternatively the vehicle includes a tank of displacing liquid. The tank would be carried by the vehicle so that the vehicle can serve as a self-contained unloading station.

The manifold system accommodates a staged on-loading and off-loading of the gas using the individual tiers of connected pipes. If all the pipes were unloaded at one time, the off loading would require a large volume of displacement fluid and an uneconomic amount of horsepower to move the displacement fluid. The displacement of the fluid requires at least the same pressure as that of the compressed natural gas. Thus, if the gas is all off loaded at one time, all of the displacement fluid must be pressurized to the same pressure as the gas. Therefore, it is preferred that the off-loading of the gas using the displacement liquid be done in stages. In a staged off-loading, one tier of pipes is off-loaded at a time and then a another tier of pipes is off-loaded to reduce the amount of horsepower required at any one time. During off-loading, once the first tier is off-loaded, then as the displacement fluid completely fills the first tier of pipes which previously had compressed natural gas, that displacement fluid may be directed to the next tier of pipes to be off-loaded and is used again.

After the gas is removed from a tier, the displacement fluid is pumped back out to the storage tank with other displacement fluid in the storage tank being pumped into the next tier to empty the next tier of pipe containing compressed natural gas.

The natural gas is offloaded in stages to save horsepower and also reduce the total amount of displacement fluid. The displacement fluid is ultimately recirculated back to the storage reservoir where any natural gas that has been absorbed by the displacing liquid is scavenged. The storage reservoir is kept chilled.

In transporting heavier composition gases, it may be desirable to remove some or most of the higher molecular weight components before providing the gas to the user. Some users, such as a dedicated power plant, may want the added heating value and not want the heavier hydrocarbons removed. In this scenario, the gas storage system has, for example, 0.7 specific gravity gas which is about 83 mole percent methane but includes other components, such as ethane, and still heavier gas components, such as propane and butane, and is stored at a temperature of −20° F. and at a pressure of about 1,350 psi. The gas will pass through an expansion valve at the receiving station and is allowed to expand as it is offloaded. As the gas cools down and the pressure drops, the liquids will drop out, or gas leaves the critical phase, and becomes liquid. The liquid hydrocarbons will start to form once the pressure drops to about 1000 psia and will be completely removed from the gas as the pressure approaches 400 psia. As the liquids fall out, they are collected and removed.

This process will be accelerated by the temperature drop associated with the expansion of the gas, therefore no supplementary cooling is required. The prior art processes require a chiller to chill the gas to remove the liquids. The amount of expansion and resultant chilling is dependent on the gas composition and the desired final product. It is doubtful that the gas will have to be recompressed for the receiving pipeline because of the reduced temperature of the gas. However, if the gas pressure must be reduced to a pressure below that required for the pipeline, the gas would be recompressed.

Referring again to FIG. 18, the pipe on the gas storage system may be divided into four horizontal tiers 200, 210, 220, and 230. Each tier 200, 210, 220, and 230 represents a bundle of pipes 202, 212, 222, and 232. The bundles may be divided evenly across the cross section or they may be divided as regions, such as the group of pipes around the perimeter as one tier and an even division of the remaining pipes as the other tiers. Each tier 200, 210, 220, and 230 has an entry tier manifold 76, 214, 224, and 234 and an exit tier manifold 91, 216, 226, and 236 at each end of pipes 202, 212, 222, and 232 extending to master manifolds 90 and 88 which extend to connections at the dock where further manifolding takes place.

Displacement liquid held in storage tank 300 is introduced into tier 200 through manifold 90 where valve 145 is open and valves 272, 274, 276, and 121 are closed. The displacement liquid is pumped under pressure through valve 145 into manifold 90 and into pipes 202. As the displacement liquid enters pipes 202, gas is forced out into manifold 206, through valve 91 and manifold 88 towards the dock. Assuming a 0.28 BCF vehicle, displacement liquid is pumped into tier 200 at a rate of $$Q = 1.068E6\ \text{ft}^3/10\ \text{hrs} = 13315\ \text{gpm} \tag{9}$$

Liquid removal occurs from the last tier, tier 232, at the end of the displacement time.

When tier 200 is fully displaced, the displacement liquid is removed back through manifold 76 and out through valve 121 and manifold 260, with valve 145 now closed. The displacement liquid is fed back to the storage tank 300 where displacement liquid is simultaneously being pumped to tier 210. Tier 210 is filled with displacement liquid from storage tank 300 through manifold 90, valve 272 and manifold 214, with valves 145, 274, and 276 closed. Tier 210 gas is forced out in the same fashion as tier 200 with gas evacuating through manifold 216, valve 246 and manifold 88 towards the dock. In effect the displacement liquid used in tier 200 becomes part of the reservoir used to displace the gas in tier 210. Thus, there is less need to store enough displacement liquid to fill the entire set of pipes at the receiving station. This process is repeated with each successive tier 220 and 230 until the gas containment system has been evacuated or as much gas remains in the system as is desired for the return trip. The electric horsepower for this operation, assuming a pressure rise of 1500 psi from tank to gas storage system, is $$Hp = 1500\times144\times13315/0.8\times2.468E5 = 14567 \tag{10}$$

where an overall pump efficiency of 0.8 has been assumed. The gas has been allowed to expand from 1840 to 1500 psi in initial offloading. Converting the horsepower to kw-hrs over the 10 hour period and using the 0.28 BCF (less fuel gas for a 2000 mile round trip) gives a cost per MCF of $0.0157, for a kw-hr cost of $0.04.

The tiered off-load system has other advantages in that the liquid storage tank, which is required, is much smaller. Also, since the amount of liquid stored on the vehicle during off-load is about a third of what it would be without tiering, the pipe support structure need not be as strong, i.e. the structure required to support liquid filled pipe can be stronger than that required to support gas filled pipe.

The displacing liquid is at the same temperatures as the gas and therefore it produces no thermal shock on the pipe. After the natural gas has been off-loaded and the vehicle is returning for another load of gas, the pipes may contain a small amount of natural gas reserved to fuel the vehicle on the return trip. This remaining gas on the return trip is below −20° F. because it has expanded. The temperature will drop even more as the gas is used for fuel. Thus, the pipes may be a little cooler when they return, depending on the effectiveness of the insulation.

After the pipes are refilled with compressed natural gas, the temperature is returned to 20° F. Preferably the temperature of the pipes is maintained within a small range of temperatures during on-loading and off-loading and transporting natural gas. The pipes will hold approximately 50% of the load at ambient temperature. Therefore, if the gas temperature rises to an unacceptable level, the most that needs to be flared is ½ of the natural gas. The remaining load and pipes will then be at ambient temperature. Thus, when the vehicle reaches its destination, the compressed natural gas is off-loaded, and then when the vehicle is reloaded with natural gas, it is necessary to cool down the pipes using a method similar to that used when the first load of compressed natural gas is loaded onto the vehicle.

The displacement fluid is preferably off-loaded to an insulated tank. There are pumps on the vehicle for pumping the displacement fluid to the tanks. The tank is maintained at low temperatures using a chiller so that when the displacement fluid is circulated onto the vehicle, low temperature control is not lost. This prevents thermally shocking the pipe. The displacement fluid has a freezing point well below the operating temperature of the gas storage system.

There must be enough fluid to displace at least one tier of the pipe plus enough to fill the tier manifolding and the pump sump in the tank. However, because there are a plurality of tiers of pipes on the vehicle, it is unnecessary to have sufficient methanol to completely displace the gas in the pipe on the vehicle in one pass.

One of the reasons to use a displacement fluid is to prevent expanding the natural gas on the storage system or vehicle during off-load. If the natural gas expanded on the storage system or vehicle, there would be a drop in temperature. Therefore, during off-loading, the valves 91, 122 are opened allowing the natural gas to completely fill the manifold system. The master manifolds 88 extend to closed valve 146 at the manifolds such that the natural gas completely fills the manifold system to the closed valve 146. Thus the pressure drop occurs across the valve 146 which off-loads the gas. The gas will expand some as it fills the manifold system. However this is an insignificant amount as compared to the whole load of natural gas on the storage system or vehicle.

When the manifold system extending to the closed valve reaches storage system pressure, the closed valve is opened and all expansion takes place across the valve. This keeps the down stream pressure from being imposed on the storage system. At the valve, the temperature is going to drop a lot and that provides an opportunity to remove the heavier hydrocarbons from the natural gas. The gas is then normally warmed, although it need not be warmed if it were being passed directly to a power plant. The time to on-load or off-load is a function of the equipment.

Alternatively, the offloading of natural gas could be achieved by simply allowing the gas to warm and expand. The storage system could be warmed in ambient conditions or heat could be applied to the system by an electrical tracing system or by heating the nitrogen surrounding the system. It may also be necessary to scavenge gas remaining in the storage system through the use of a low suction pressure compressor. This method is applicable to mainly slow withdrawal over an extended period of time.

Transportation of CNG Using Gas Storage System

The present invention finds utility in any application where gas needs to be transported and/or stored in large quantity or the space for storage of gas is very limited. A storage system constructed in accordance with the present invention can be used in the land based transport of gases by mounting the storage system on a truck or train. The present invention can be used where it is desired to store gas in large quantities, such as in storage facilities for use in generating power. The present invention also finds utility in the storage of small quantities of gas where storage space is at a premium, such as to temporarily store gas at an offshore structure.

Figure 21:
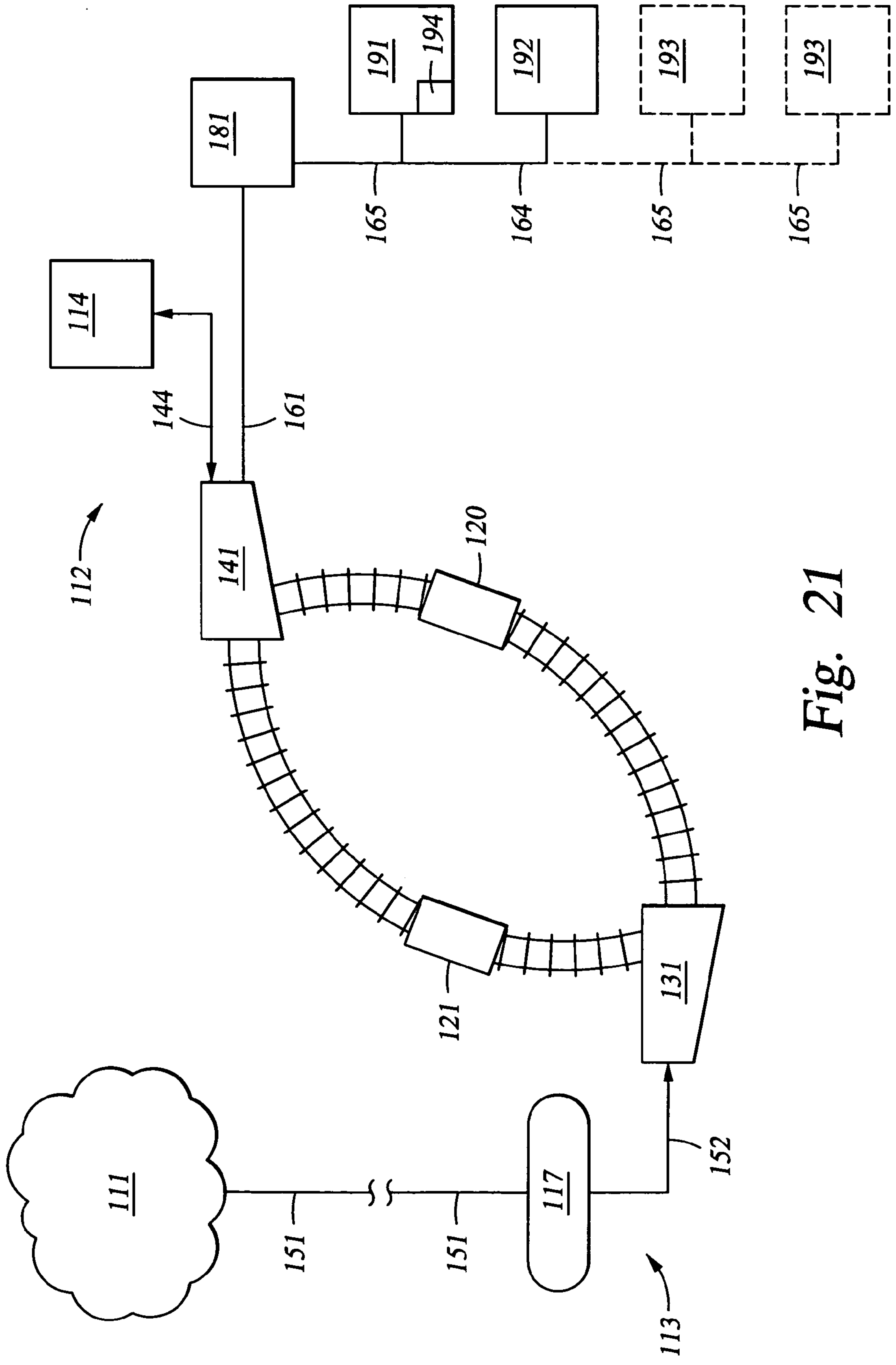
FIG. 21 is a schematic of the method of transporting gas from an on-loading station having gas production to an off-loading station with customers.

Referring now to FIG. 21, there is described a detailed example of the overall method of transportation of the gas, including a further description of the on-loading and off-loading of the gas. The preferred land based gas transportation system of the present invention is preferably directed to a source of natural gas such as a gas field 111. The composition of the natural gas delivered from a gas field 111 is preferably pipeline quality natural gas, as is known in the art. A loading station 113, capable of receiving gas at a pressure of approximately 400 psi or other pipeline pressure, is provided for preparing the gas for transportation. Multiple offshore fields can be connected to a central loading facility, providing the combined loading rates are high enough to make efficient use of the vehicle(s).

Loading station 113 preferably includes compressing and chilling equipment, such as compressor/chiller 117, as is known in the art, for compressing the natural gas to a pressure of approximately 1800 psia, for the 0.6 specific gravity gas example, and chilling the gas to approximately −20° F. For example, compressor/chiller 117 may comprise multiple Ariel JGC/4 compressors driven by Cooper gas-fired engines, depending on capacity, with York propane chilling systems. Loading station 113 is preferably sized to load CNG at a rate greater than or equal to approximately 1.0/0.9 times the rate at which CNG will be consumed by end users, to optimize the capital cost of the loading station 113 and optimize its operating costs.

Loading station 113 is also preferably provided with a loading dock 131 for loading the compressed and chilled natural gas aboard a CNG transporting vehicle, such as a train or truck, for transporting the gas produced from the gas field 111. The gas field 111 and the loading station 113 may be connected by a conventional gas line 151 as is well known in the art. Likewise, the compressor/chiller 117 is connected to loading dock 131 by an insulated conventional gas line 152. Vehicles, such as train car 10, is provided for transportation of the CNG. A plurality of trains are preferably provided so that a first train can be loaded while a previously loaded second train is in transit. In actual practice, the choice between trains and trucks as the vehicle of choice will depend on the relative capital costs and the relative travel time between the two options. Although the preferred method of the present invention will be described with respect to trains, it should be understood that trucks or any other type of land based transport may be used without departing from the scope of the invention.

A receiving station 112 is provided for receiving and storing the transported natural gas and preparing it for use. The receiving station 112 preferably comprises a receiving dock 141 for receiving the CNG from the train cars 10, and an unloading system 114 in accordance with the present invention for unloading the CNG from train cars 10 to a surge storage system 181.

Surge storage system 181 may comprise a surface based storage unit or underground porous media storage, such as an aquifer, a depleted oil or gas reservoir, or a salt cavern. One or more vertical or horizontal wells (not shown), as are well known in the art, are then used to inject the gas and withdraw it from storage. The surge storage system 181 preferably is designed with a CNG storage capacity that is sufficient to supply the demand of users, such as a power plant 191, a local distribution network 192, and optional additional users 193, during the time period between arrival of the second train 120 and first train 121 at receiving dock 141. For example, surge storage system 181 may have the capacity to accept two train loads of CNG and provide sufficient CNG to supply users 191, 192 (and 193, if provided) for about two weeks without being re-supplied. The power plant 191 may include a turbine 194 for consuming the gas to generate energy, such as electricity. The surge storage system 181 is required in some cases to allow a train 10 to unload CNG as rapidly as possible and to allow for a disruption in demand for CNG such as a failure of power plant 191. Additionally, surge storage system 181 should have about two weeks of reserve capacity to supply users 191, 192 in the event a hurricane or earthquake disrupts the supply of CNG. It should be appreciated that the modular storage unit 230 may be used as the surge storage system 181.

Receiving dock 141 is connected to the unloading system 114 by displacing liquid line 144. The receiving dock 141 is also connected to the surge storage system 181, by gas line 161, as is well known in the art. Similarly, gas lines 163 and 164 connect the surge storage system 181 to gas users, such as power plant 191 and local distribution network 192, respectively. Additional gas lines 165 may optionally connect surge storage system 181 to the additional users 193, if required, without departing from the scope of the present invention.

Alternatively, where a large existing gas distribution system is already in place, surge storage system 181 may not be necessary. In this case, line 161 is connected directly to lines 163, 164 (and 165, if provided) for discharging the CNG directly into the existing distribution system. Further, where the demand rate of CNG by users 191, 192 (and 193, if provided) is very high, unloading system 114 may be designed with sufficient capacity that the rate of discharge of CNG from train cars 10 equals the total demand rate by users 191, 192, 193. It can be seen that in such a case, receiving dock 141 and unloading system 114 are in substantially constant use. Finally, surge storage system 181 may comprise an on-shore, or offshore, pipe with satisfactory surge capacity, conventional on-shore storage, a system of cooled and insulated pipes using the methods of the present invention, or the CNG vehicle itself may remain at the dock to provide a continuing supply, although these options significantly increase the cost of receiving station 112.

In operation, pipeline quality natural gas flows from gas field 111 to loading station 113 through gas line 151. One skilled in the art will appreciate that the present invention may load natural gas. At loading station 113, compressor/chiller 117, as an example, compresses the natural gas to approximately 1800 psi and chills it to approximately −20° F., to prepare the gas for transportation. The compressed and chilled gas then flows through gas line 152 to loading dock 131. The gas is then loaded aboard train cars 10 by conventional means at loading dock 131.

In the embodiment illustrated schematically in FIG. 21, second train 120 has already been loaded with CNG at loading dock 131. After loading, second train 120 then proceeds on to its destination. A portion of the CNG loaded may be consumed to fuel train 120 during the voyage. Fueling train 120 with a portion of the loaded CNG has the additional advantage of cooling the remaining CNG, by expansion, thus compensating for any heat gained during the voyage and maintaining the transported CNG at a substantially constant temperature. While second train 120 is in route, first train 121 is loaded with natural gas at loading dock 131. Although only two trains 121, 120 are shown, it will be recognized by one skilled in the art that any number of trains may be used, depending on, for example: the demand for natural gas, the travel time for the transporting trains 121, 120 to travel between loading dock 131 and receiving dock 141, and the rate of gas production from gas field 111.

Upon its arrival at its destination, second train 120 is unloaded at receiving dock 141 of receiving station 112. Unloading system 114 unloads the natural gas transported aboard second train 120 by allowing the gas to first expand to the pressure of surge storage system 181 and then to flow through gas line 161. Remaining gas is unloaded using displacing liquid line 144, as will be described further below. The natural gas in surge storage system 181 is then provided through gas lines 163 and 164 to users, such as the power plant 191 and the local distribution network 192, respectively. Thus, gas may be continuously withdrawn from surge storage system 181 and supplied to users 191, 192 although gas is only periodically added to surge storage system 181.

During the process of unloading, sufficient gas is allowed to remain aboard second train 120 to provide fuel for the return trip to loading dock 131. After unloading, second train 120 undertakes the return trip to loading dock 131. First train 121 then arrives at receiving dock 141 and is unloaded as described above with respect to second train 120. Second train 120 then arrives at loading dock 131 and the on-loading/off-loading cycle is repeated. The on-loading/off-loading cycle is thus repeated continuously.

When more than two trains 121, 120 are used, the on-loading/off-loading cycle is also repeated continuously. The frequency with which the on-loading/off-loading cycle must be repeated (and thus the number of trains required) depends on the rate at which gas is withdrawn from surge storage system 181 for supply to users 191, 192 and the capacity of surge storage system 181.

In the prior art, gas being carried by high pressure pipe is being carried by truck or train at pressures around 3,000 psi. The pipe is used as a high pressure cylinder. The present invention can use a lower pressure with a cooler temperature. The present invention stores the gas at around 1,500 psi. A gas at 0.7 compressibility would be stored at a pressure around 1,350 psi. One application would be to take gas from a producing well and store it in a modular gas storage unit for transportation to a power plant. The size of the unit would be determined by the size of the train or truck. Although the diameter of the pipe could be reduced, it is preferred to use large diameter pipe to reduce the amount of manifolding required. Thus if possible, 36 inch diameter pipe would be preferred. For a shorter length of pipe, the diameter might be reduced to 24 inches.

Figure 22:
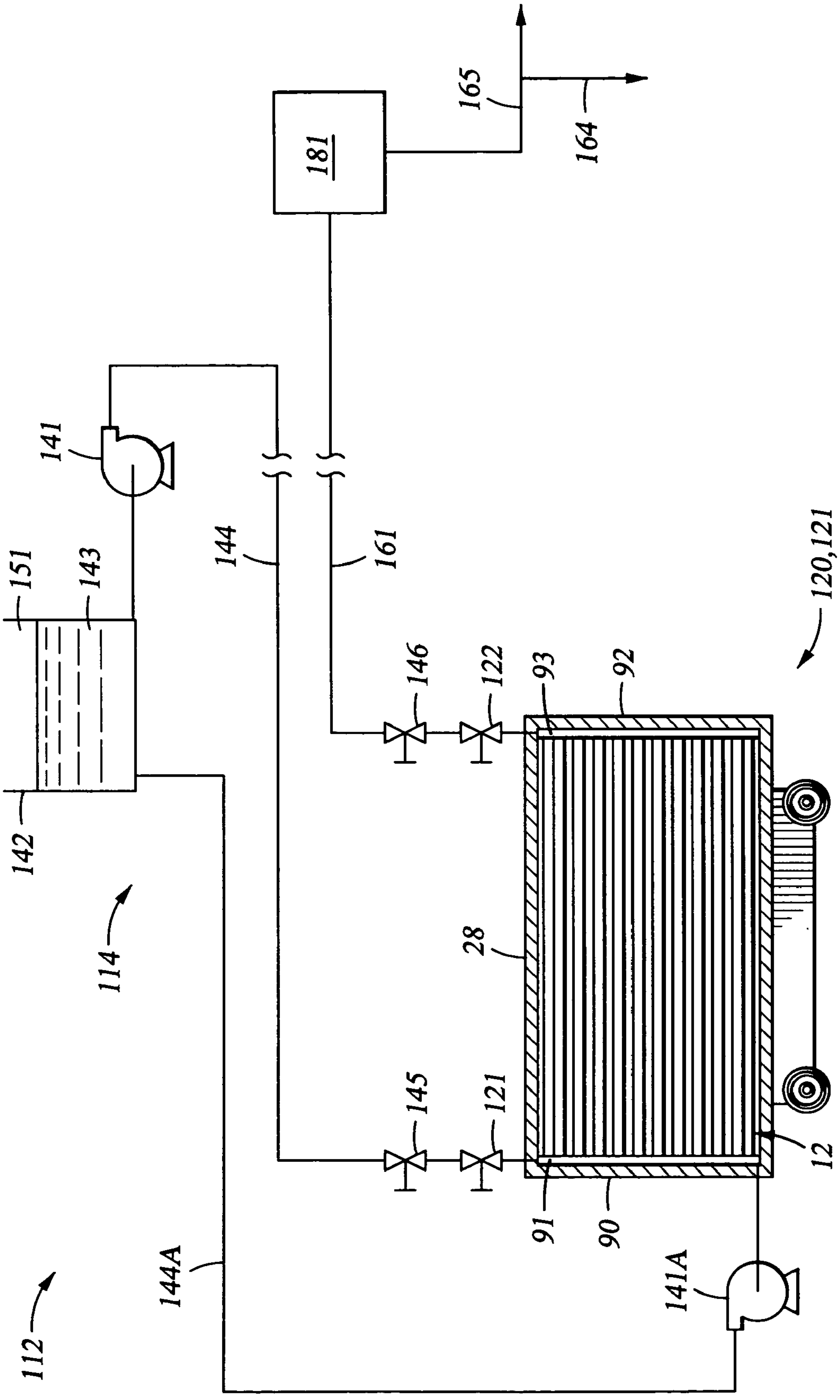
FIG. 22 is a schematic of a method for on-loading and off-loading gas from the vehicle having gas storage pipes.

Referring now to FIG. 22, there is shown a schematic representation of an embodiment of a compressed natural gas off-loading system for use in practicing the method of the present invention. The off-loading system, denoted generally by reference numeral 114, preferably comprises a displacing liquid 143, a insulated surface storage tank 142 for storing the displacing liquid 143, and a pump 141 connected to an outlet of insulated surface storage tank 142 for pumping the displacing liquid 143 out of surface storage tank 142. A liquid return line 144*a* and return pump on shore are provided to return the liquid to the liquid storage tank 142. One or more sump pumps 141*a* may be provided on vehicle 10. Sump pumps 141*a* on the vehicle 10 returns the liquid to the tank 142 through the return manifold system 144*a*.

The displacing liquid 143 preferably comprises a liquid with a freezing point that is below the temperature of the CNG transported aboard trains 121, 120, which is approximately −20° F. Further, the composition of displacing liquid 143 preferably is chosen so that the CNG has only negligible solubility in displacing liquid 143. A suitable displacing liquid which meets these requirements, and is relatively readily available at reasonable cost is methanol. Methanol is known to freeze at approximately −137° F., and CNG has low solubility in methanol.

A displacing liquid line 144 is preferably provided to connect the pump 141 to trains 121 or 120. A first displacing liquid valve 145 is preferably disposed in displacing liquid line 144 to prevent the flow of displacing liquid when valve 145 is closed, such as when train 120 is not present. Similarly, a first gas valve 146 is preferably disposed in gas line 161 to prevent the backflow of gas when valve 146 is closed, such as when train 120 is in transit.

Pump 141 preferably comprises one or more pumps and pump drivers, arranged in series and/or parallel, and capable of producing sufficient methanol pressure at its discharge to overcome the pressure of surge storage system 181, the methanol flow losses in displacing liquid line 144, and any downstream flow losses in displacing the CNG to surge storage system 181. The capacity of reversible pump 141 depends on the unloading rate that is desired for train 120.

In the embodiment described above with respect to FIG. 32, trains 121, 120 are illustrated as including multiple storage pipes 12 for storing the gas being transported. It will be understood by one skilled in the art that any number of gas storage pipes 12 may be carried on trains 121, 120 without departing from the scope of the present invention. For example, multiple gas storage pipes 12 may include 20 inch diameter, 0.375 inch wall thickness, welded sections of X-80 or X-100 steel pipe, rack mounted and manifolded together in accordance with relevant codes. Such pipes may be satisfactory in terms of both performance and cost. Other materials may of course be used, provided they are capable of providing satisfactory service lifetimes and are able to withstand the CNG conditions of approximately −20° F. and approximately 1800 psi.

Likewise, many acceptable means of insulating gas storage pipes 12 are possible, provided the CNG stored therein is maintained at a substantially constant temperature of approximately −20° F. over the time of its transit from loading station 131 to unloading station 141, including any idle time and any time required for the on-loading and off-loading processes. For example, with the 20 inch diameter pipe described above and expansion cooling provided by fueling the vehicle with CNG, an approximately 12-24 inch layer of polyurethane foam around the outside of the gas storage pipes 12 should result in the temperature being maintained at around −20° F. Other insulation, such as a 36 inch thick layer of perlite having a thermal conductivity of approximately 0.02 Btu/hour/foot/° F. or less are also acceptable.

The unloading process is then practiced as previously described.

Alternative Uses

The pipe based storage system of the present invention can also be used in the transport of liquids. The advantage to the present invention relates to the design factor for the pipe as compared to a tank. If the pipe only needs to be built twice as strong as is required (i.e. a design factor of 0.5), and the design factor for the tank is 0.25, then the tank will be four times stronger than is required. For example, liquid propane has a particular vapor pressure and the storage pipe can be designed for a pressure twice as great as the vapor pressure of the liquid propane. This means that the storage of liquid propane in a pipe would be cheaper than in a tank. It would also be cheaper to use pipes for liquid propane if the propane was going to be transported on a vehicle. The liquid propane would be transported in the pipe at ambient temperature.

Implementation of System

The self-contained modular unit 230 of the present invention may be used for the efficient permanent or temporary storage of gas. Although gas may be stored in naturally occurring gas storage facilities, such as salt caverns, or subterranean formations, often such naturally occurring gas storage facilities are not available near the point of use of the gas such as located near the power companies or other industry users. Thus previously, the gas had to be stored in pressurized vessels or tanks. For the volumes required, it is much more expensive to store the gas in a prior art gas storage tank because the tanks must have very thick walls to hold the pressure. The pipeline companies may use the traditional pipeline to store gas and some pipelines have line storage in the form of loops of pipeline to store gas at pipeline conditions.

If the gas is stored as LNG, then the capital cost and operational costs increase. For peak shaving to reduce the cost of providing gas during peak periods of demand, gas transported to the power plant by pipeline is processed and stored as liquid natural gas. The LNG is then heated for use during peak periods. However, as previously discussed, LNG is much more expensive to store than CNG.

The modular gas storage unit 230 of the present invention overcomes these deficiencies in the prior art by providing a permanent or temporary gas storage system with a more efficient means for storing the gas. The modular gas storage unit 230 may be located near the centers of energy consumption and is cheaper than a large gas storage tank. For example, the modular gas storage unit 230 may be used for storage for peak shaving, as a backup supply to avoid disruption, as the surge storage system 181, or storage for delivery by other means, such as pipeline. The modular gas storage unit 230 may take any shape appropriate for the installation and may be buried if desired. The modular gas storage unit 230 provides a more economical alternative for storing the gas and potentially at less capital cost and lower operational costs.

The gas stored in the modular gas storage unit 230 is maintained in the pipes 232 in the gas critical stage, i.e., dense phase. The gas is stored in the modular gas storage unit 230 at an optimized pressure and temperature so that the compressibility factor is maximized and the gas is stored at more mass per unit of volume, than other prior art storage systems. The modular gas storage unit 230 has pipes with optimized wall thickness thereby using thinner and less expensive pipes to hold the pressurized gas. Mass produced quality steel pipe may be used as the gas storage means which has a design factor of 0.5. A prior art storage tank is individually manufactured and must use a plurality of plates welded together to achieve a design factor of 0.25. Using the pipe means that the steel only needs to be twice as strong as is required while the steel for the prior art tanks must be four times as strong as is required. Further, the present invention can use a lower pressure with a cooler temperature. The modular gas storage unit 230 stores pipeline quality gas, which is substantially pure methane with a small residual liquid, such as propone components, with a specific gravity of 0.6 such that the pressure is around 1,800 psi. A gas with a 0.7 specific gravity can be stored at a pressure around 1,350 psi.

The modular gas storage unit 230 is particularly useful for the storage of gas for peak shaving, i.e., high-demand periods. The gas would be cooled and compressed and stored in a modular gas storage unit 230 near the location of use. Gas from a pipeline would be slowly fed into the storage unit 230 during the low-usage times and stored for use during times of higher demand, thus serving as a peak shaving system.

Using the modular gas storage unit 230 of the present invention, power companies can contract for a lower level of deliverability from the pipeline companies by having the modular gas storage unit 230 with additional gas available to use that gas to generate additional power during periods of peak demand. This way they can reduce the amount they have to pay for deliverable capacity from the pipeline companies. A gas turbine is on standby such that when the peak demand occurs, gas is supplied from the modular gas storage unit 230 to the turbine to generate the additional electricity required to meet the peak demand.

Further, there is the possibility of a higher turn-over rate of the gas from the modular gas storage unit 230. Therefore, it would be economical for the gas storage unit of the present invention to be used more for a daily or monthly operational use and not for seasonal storage. For example, if the modular gas storage unit 230 had 100 million cubic foot gas storage capacity, the entire storage unit could be emptied in one day, whereas it would be uneconomical to vaporize the same quantity of gas stored as LNG in the same time period.

Another method includes taking the gas directly to the power plant from a producing well using a vehicle with a modular gas storage unit 230. The size of the modular gas storage unit 230 would be determined by the size of the vehicle, such as a train or truck. The modular gas storage unit 230 mounted on a truck would have to meet Department of Transportation requirements. Although the diameter of the pipe could be reduced, it is preferred to use large diameter pipe to reduce the amount of manifolding. Thus if possible, 36 inch diameter pipe would be preferred. For a shorter length of pipe, the diameter might be reduced to 20 or 24 inches.

Another use of the methods and apparatus of the present invention include the use of the modular gas storage unit 230 during the drilling and testing of hydrocarbon wells when gases are often produced. Because these functions normally occur before production facilities are in place, there is often no way to contain the gas on-site or get the gas to a processing facility through a pipeline, or other means. Presently, when conducting an extended well test on a new offshore well, barges, having production equipment, are docked adjacent to the offshore drill rig. On a land based rig, the production equipment may be truck based. The production package is connected to the well and separates the oil from the gas. The gas is then burned in the atmosphere using flares. Not only is this a waste of useful gas product but many governments are restricting the use of atmospheric flares and the release of emissions from these operations.

Thus, one potential use of the modular gas storage system 230 is in the temporary storage of excess gas during well development and testing. The modular gas storage system 230 would be self-contained. A smaller version of the modular gas storage system 230 of the present invention, co-located with the production system, could replace the use flares. Instead of burning the gas produced, the gas can be chilled, compressed, and stored in the gas storage system of the present invention. An embodiment of the present invention could be used to efficiently and economically receive, store, and transport the residual gas from well testing to a location at which it could be used. Also, it may not be necessary to use a displacement fluid to offload gas produced in a new well site since the modular gas storage system 230 would be unloaded from the barge and the gas could be offloaded over time. One modular gas storage system 230 would be removed from the barge and a new one could be put on. The modular gas storage system 230 would be mounted on skids onshore.

The basic design of the modular gas storage system 230 is the same for each of these applications. The volume of gas carried by the modular gas storage system 230 or stored by the modular gas storage system 230 will vary depending on location. The pipe diameter and size of pipe may remain the same. The modular gas storage system 230 is designed based on the compressibility factor of the particular gas being stored. The modular gas storage system 230 used onshore will typically be designed for methane, a pipeline quality gas, which is the typical gas being used for power plants.

While it is preferred that the storage system of the present invention be used at or near its optimum operating conditions, it is considered that it may become feasible to utilize the system at conditions other than the optimum conditions for which the system was designed. It is foreseeable that, as the supplies of remotely located gas develop and change, it may become economically feasible to employ storage systems designed in accordance with the present invention at conditions separate from those for which they were originally designed. This may include transporting a gas of different composition outside of the range of optimum efficiency or storing the gas at a lower pressure and/or temperature than originally intended.

While a preferred embodiment of the invention has been shown and described, modifications thereof can be made by one skilled in the art without departing from the spirit of the invention.

What is claimed is:

1. A system for storing and transporting gas comprising a vehicle; and a gas storage system disposed on said vehicle and designed to minimize the compressibility factor of the gas and maximize the ratio of the mass of the gas to the mass of the storage system.

2. The system of claim 1 wherein said gas storage system is designed for a single specific gravity and further comprising a reservoir of hydrocarbons available to adjust the specific gravity of the transported gas to the desired value.

3. The system of claim 1 wherein said vehicle is specially constructed for use in transporting gas and the gas storage system is constructed integral to the vehicle as the vehicle is being constructed.

4. The system of claim 1 wherein said gas storage system comprises:

a plurality of pipes arranged in tiers;

insulation at least partially surrounding said plurality of pipes for insulating said pipes to maintain a reduced temperature;

a system for unloading gas from said pipes;

a system for loading gas into said pipes;

a manifold system connecting said pipes to said loading and unloading system; and a structural flame to support said pipes.

5. The system of claim 4 wherein said pipes are 20 inches in diameter.

6. The system of claim 4 wherein said insulation comprises a nitrogen atmosphere at least partially surrounding said pipes.

7. The system of claim 4 wherein said structural flame is constructed from I-beams fixably attached to the carriage of said vehicle and provides structural support to the vehicle.

8. The system of claim 7 wherein said I-beams are placed between each tier of pipe and welded together.

9. The system of claim 4 wherein said insulation comprises a polyurethane foam.

10. The system of claim 4 wherein said structural frame is constructed from thin straps formed from steel plate to conform to the outside diameter of said pipes, wherein said straps are placed between tiers of pipe and fastened to straps on adjacent tiers.

11. The system of claim 10 wherein said pipes are not fastened to said straps.

12. The system of claim 4 wherein said manifold system comprises:

a valve and a pressure gauge attached to the manifold; and a piping system at each end of said pipes to divide said pipes into groups to facilitate the loading and unloading of gas.

13. The system of claim 12 wherein said piping system comprises a manifold for each horizontal tier of pipes, each horizontal manifold being connected to a master vertical manifold.

14. The system of claim 1 further including a conduit communicating a reservoir of hydrocarbons with the gas to be stored in said pipes for adding hydrocarbons to said in such an amount such that the resultant gas to be stored in the pipes has a predetermined specific gravity.

15. A system for the storage and transport of compressed natural gas, the system comprising:

a vehicle with a carriage;

a plurality of pipes;

a support structure including support members extending between rows of pipe and a frame forming an enclosure around said pipes;

said pipes and support structure forming a modular unit; and said modular unit being disposed on said carriage, wherein said modular unit has a tilted orientation to said carriage.

16. The system of claim 15 wherein said modular unit may be loaded and unloaded from said vehicle.

17. The system of claim 4 wherein said loading and unloading system further comprises a displacement fluid that is selectively pumped into or out of said plurality of pipes.

18. The system of claim 17 wherein during loading and unloading said plurality of pipes are disposed such that said plurality of pipes has elevated and lowered ends.

19. The system of claim 18 wherein during loading of said plurality of pipes the displacement fluid is drained from the lowered end while compressed natural gas is pumped into the elevated end.

20. The system of claim 18 wherein during unloading of said plurality of pipes the displacement fluid is pumped into the lowered end while compressed natural gas is removed from the elevated end.

21. The system of claim 15 further comprising a manifold coupled to said plurality of pipes, wherein said manifold is operable to couple said plurality of pipes to loading and unloading systems that comprise a displacement fluid that is selectively pumped into or out of said plurality of pipes.

22. The system of claim 21 wherein during loading of said plurality of pipes the displacement fluid is drained horn a lower end of said plurality of pipes while compressed natural gas is pumped into an upper end of said plurality of pipes.

23. The system of claim 21 wherein during unloading of said plurality of pipes the displacement fluid is pumped into a lower end of said plurality of pipes while compressed natural gas is removed from an upper end of said plurality of pipes.

* * * * *